United States Patent [19]

Negishi et al.

[11] Patent Number: 5,671,067
[45] Date of Patent: Sep. 23, 1997

[54] FACSIMILE APPARATUS FOR OPTICALLY RECOGNIZING CHARACTERS AND TRANSMITTING THE RECOGNIZED CHARACTERS AND COMMUNICATION SYSTEM FOR TRANSMITTING THE RECOGNIZED CHARACTERS BETWEEN A TERMINAL AND A CENTER

[75] Inventors: Ryuichi Negishi, Kawasaki; Kiyonori Sekiguchi, Tokyo; Koichi Nagoshi; Hiroshi Saza, both of Yokohama; Kiyohiko Honda, Tokyo, all of Japan

[73] Assignee: Matsushita Graphic Communication Systems, Inc., Tokyo, Japan

[21] Appl. No.: 463,539

[22] Filed: Jun. 5, 1995

[30] Foreign Application Priority Data

Sep. 26, 1994 [JP] Japan .................................. 6-229523
Nov. 28, 1994 [JP] Japan .................................. 6-292871

[51] Int. Cl.$^6$ .............................. H04N 1/00; H04N 1/32
[52] U.S. Cl. .................... 358/403; 358/434; 358/444; 358/468; 358/401; 382/175; 382/317
[58] Field of Search ............................ 358/402, 468, 358/403, 404, 444, 434, 439, 440, 453; 379/100; 382/317, 175; 395/114, 115, 109

[56] References Cited

U.S. PATENT DOCUMENTS

| | | | |
|---|---|---|---|
| 5,247,591 | 9/1993 | Baran | 358/402 |
| 5,282,052 | 1/1994 | Johnson et al. | 358/402 |
| 5,448,375 | 9/1995 | Cooper et al. | 358/403 |
| 5,465,167 | 11/1995 | Cooper et al. | 358/468 |
| 5,479,269 | 12/1995 | Bronnenberg et al. | 358/468 |

Primary Examiner—Edward L. Coles, Sr.
Assistant Examiner—Fan Lee
Attorney, Agent, or Firm—Lowe, Price, LeBlanc & Becker

[57] ABSTRACT

A communication system is composed of an OCR-FAX apparatus for reading contents of an order written in an optical character recognition (OCR) document sheet and performing an optical character recognition for the contents and an OCR center apparatus for receiving pieces of character recognized data obtained in the OCR-FAX apparatus and transmitting pieces of format information of the OCR document sheet to the OCR-FAX apparatus. A basic program of an OCR recognition program is stored in advance in a ROM region of an IC card. A subordinate program of the OCR recognition program and a piece of OCR document sheet identifying information are temporarily stored in a SRAM region of the IC card and are transferred to an EEPROM region of the IC card. The format information are temporarily stored in the SRAM region and are transferred to a format information storing unit. The format information stored is renewed by transmitting pieces of updated format information from the OCR center apparatus, and an updated OCR document sheet is printed out in the OCR-FAX apparatus according to the format information.

22 Claims, 22 Drawing Sheets

FIG. 3

<ORDER SHEET>

ORDER CODE [1][2][3][5][6]

ORDER DATE [1][0]MONTH [2][5]DAY

| COMMODITY CODES | NUMBER OR QUANTITY |
|---|---|
| [0][1][0][1] | [ ][ ][5] |
| [0][1][0][2] | [ ][ ][9] |
| [1][2][0][1] | [ ][5][3] |
| [1][2][0][2] | [ ][2][7] |
| [2][8][0][1] | [ ][1][4] |

FIG. 4

CHARACTER RECOGNITION SYSTEM    1/1 PAGE
<ORDER SHEET>
ORDER CODE   [12356]   M ELECTRONIC COMPANY
                        MEGURO
ORDER DATE   OCTOBER [25]

| COMMODITY CODES | COMMODITY NAMES | THE NUMBER OF ORDERED COMMODITIES |
|---|---|---|
| [0101] | TELEVISION | [ 5] |
| [0102] | RADIO | [ 9] |
| [1201] | BATTERY | [ 53] |
| [1202] | ELECTRONIC OVEN | [ 27] |
| [2801] | STEREO | [ 14] |

| TRANSMISSION | NEXT IMAGE | PRINT | END |

FIG. 5A

| CODE CONVERSION TABLE (NO.1) | NO. | ORDER CODES | STRAINS OF CHARACTERS |
|---|---|---|---|
| NAME OF CODE : ORDER CONVERSION TABLE CODE | 1 | 0 0 0 0 1 | S COMMERCIAL COMPANY SHINAGAWA |
| | 2 | 0 0 0 0 2 | S COMMERCIAL COMPANY SHINJUKU |
| | 3 | 1 0 0 0 1 | Y ELECTRONIC COMPANY TECHNICAL SECTION |
| | 4 | 1 0 0 0 2 | Y ELECTRONIC COMPANY BUSINESS SECTION |
| | ~ | ~ ~ | ~ |
| | n | 1 2 3 5 6 | M ELECTRONIC COMPANY MEGURO |

FIG. 5B

| CODE CONVERSION TABLE (NO.2) | NO. | COMMODITY CODES | STRAINS OF CHARACTERS |
|---|---|---|---|
| NAME OF CODE : COMMODITY CONVERSION TABLE CODE | 1 | 0 1 0 1 | TELEVISION |
| | 2 | 0 1 0 2 | RADIO |
| | 3 | 1 2 0 1 | BATTERY |
| | 4 | 1 2 0 2 | ELECTRONIC OVEN |
| | ~ | ~ ~ | ~ |
| | n | 2 8 0 1 | STEREO |

FIG. 6

| LCD DISPLAY FORMAT<br><br>STRAINS OF FIXED CHARACTERS | A STRAIN OF FIXED CHARACTERS 1 | DISPLAY STARTING POSITION (X, Y) OF A STRAIN OF FIXED CHARACTERS |
| --- | --- | --- |
| | | DISPLAYED DATA TYPE DISTINGUISHING CODE (CHARACTER RECOGNIZED DATA/RETURNED DATA) |
| | | OFFSET OF A STRAIN OF FIXED CHARACTERS |
| | A STRAIN OF FIXED CHARACTERS 2 | DISPLAY STARTING POSITION (X, Y) |
| | | DISPLAYED DATA TYPE DISTINGUISHING CODE |
| | | OFFSET |
| | ~ | ~ |
| | A STRAIN OF FIXED CHARACTER n | |
| LCD DISPLAY FORMAT<br><br>CHARACTER RECOGNIZED DATA<br><br>RETURNED DATA | A STRAIN OF DATA 1 | DISPLAY STARTING POSITION (X, Y) |
| | | IDENTIFYING SYMBOL |
| | | DISPLAYED DATA TYPE DISTINGUISHING CODE |
| | | OFFSET |
| | | CONVERSION INFORMATION: NO EXISTENCE OF CONVERTED DATA |
| | A STRAIN OF DATA 2 | DISPLAY STARTING POSITION (X, Y) |
| | | IDENTIFYING SYMBOL |
| | | DISPLAYED DATA TYPE DISTINGUISHING CODE |
| | | OFFSET |
| | | CONVERSION INFORMATION: EXISTENCE OF CONVERTED DATA |
| | | SPECIFYING INFORMATION |
| | | DISPLAY STARTING POSITION (X, Y) |
| | ~ | ~ |
| | A STRAIN OF DATA n | |

FIG. 16

| | | MONTH | DAY |
|---|---|---|---|
| | ORDERING DATE | ☐☐ | ☐☐ |

▨ MEMBER'S CODE ☐☐☐☐☐

▨ ITEM CODE ☐☐

▨ ARTICLE CODE ☐☐

01:TULIP  02:CHRYSANTHEMUM  03:SWEETPEA  04:LILY  05:DAHLIA

▨ DELIVERED CODE MONTH ☐☐  DAY ☐☐

FIG. 17A

| FREQUENCY TABLE |
|---|
| 02 |
| 10 |
| 01 |
| 03 |
| 04 |

FIG. 17B

| CODE CONVERSION TABLE | |
|---|---|
| 02 | CHRYSANTHEMUM |
| 10 | CROCUS |
| 01 | TULIP |
| 03 | SWEETPEA |
| 04 | LILY |

ORDERING DATE  MONTH ☐☐  DAY ☐☐

▨ MEMBER'S CODE ☐☐☐☐☐

▨ ITEM CODE ☐☐

▨ ARTICLE CODE ☐☐
02:CHRYSANTHEMUM  10:CROCUS  01:TULIP  03:SWEETPEA  04:LILY

▨ DELIVERED DATE MONTH ☐☐ DAY ☐☐

FIG. 20A

MANAGEMENT TABLE

| ARTICLE NAME | ARTICLE GROUP |
|---|---|
| TOMATO | A |
| MELON | A |
| WATERMELON | A |
| CHRYSANTHEMUM | B |
| SWEETPEA | B |
| ⋮ | B |
| RICE | - |
| THAI RICE | - |
| | ⋮ |

FIG. 20B

ARTICLE MENU

| ARTICLE NO. | ARTICLE NAME |
|---|---|
| 1 | TOMATO |
| 2 | MELON |
| 3 | WATERMELON |
| 4 | RICE |
| ⋮ | ⋮ |

FIG. 21

```
CHARACTER RECOGNITION SYSTEM

SELECTION ADVICE INFORMATION

GROUP SELECTION ADVICE INFORMATION
   ◉  GROUP A
   ○  GROUP B
   ○  GROUP C
          ⋮

ARTICLE SELECTION ADVICE INFORMATION
   ◉  RICE
   ○  THAI RICE
          ⋮
```

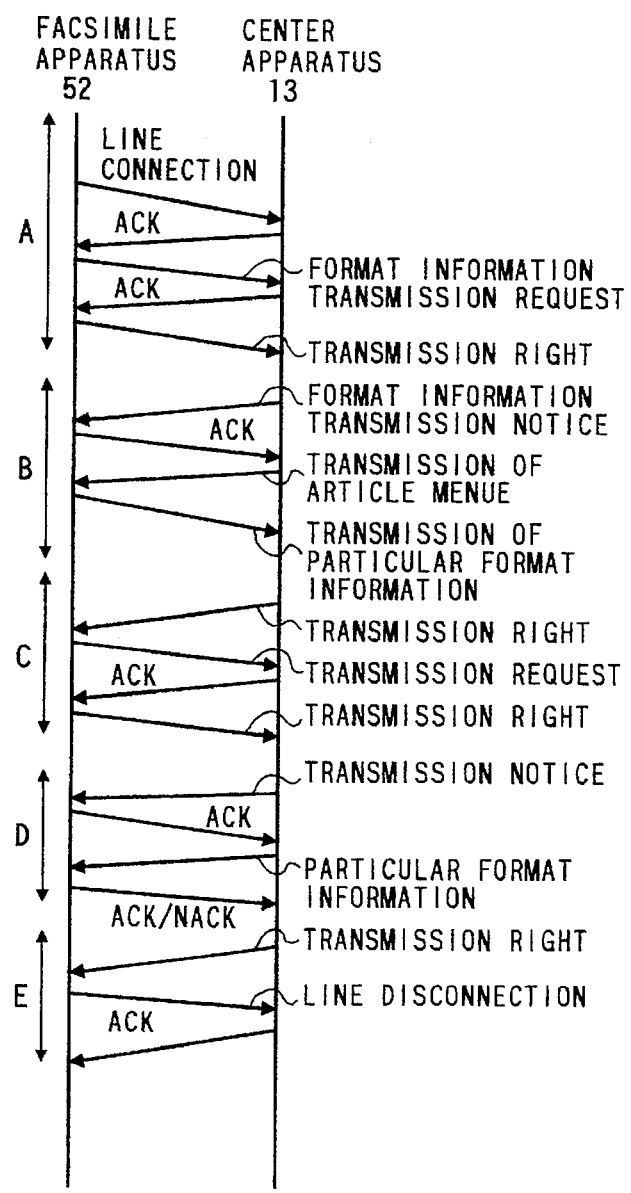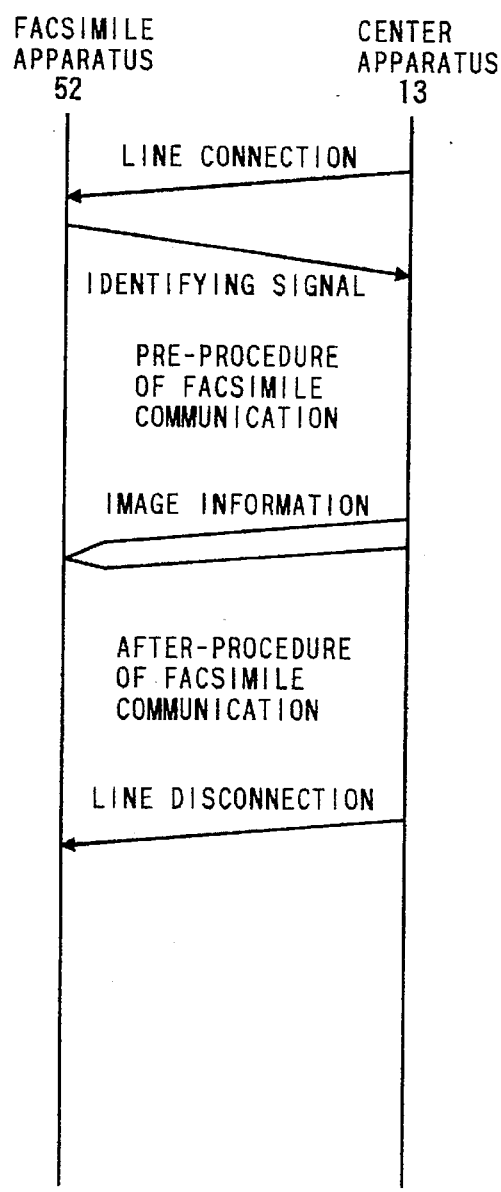

FACSIMILE APPARATUS FOR OPTICALLY RECOGNIZING CHARACTERS AND TRANSMITTING THE RECOGNIZED CHARACTERS AND COMMUNICATION SYSTEM FOR TRANSMITTING THE RECOGNIZED CHARACTERS BETWEEN A TERMINAL AND A CENTER

BACKGROUND OF THE INVENTION

1. Field of the Invention

The present invention relates generally to a facsimile apparatus in which entry information of an optical character recognition (OCR) sheet is recognized in a terminal side and recognized results are transmitted to an order-receiving center, and more particularly to a facsimile apparatus in which a plurality types of OCR sheets are printed out at the terminal side and pieces of entry information of the types of OCR sheets are recognized. Also, the present invention relates generally to a communication system in which entry information of an OCR sheet is recognized in a terminal side, and recognized results are transmitted to an order-receiving center. In particular, the present invention relates to a communication system in which a plurality types of OCR sheets are printed out at the terminal side.

2. Description of the Prior Art 2.1. PREVIOUSLY PROPOSED ART:

Contents of an order is given to an order-receiving center by phone, or a handwritten document is transmitted from an order terminal side to the order-receiving center according to a facsimile communication after the contents are handwritten. In the center, the contents of the order are manually input to a host computer through a keyboard by an operator. However, the input processing is troublesome, and an input error often occurs. Therefore, in an advanced prior art, piece of image data transmitted by facsimile are automatically converted into pieces of code data according to a character recognition processing, and the code data are input to the host computer without using the keyboard.

In detail, names of one or more ordered articles or one or more codes corresponding to the ordered articles are written in an OCR sheet, and the number of ordered articles is also written in the OCR sheet in numeral for each type of article. Thereafter, pieces of order data written in the OCR sheet is transmitted to the order-receiving center according to the facsimile communication. In the center, the order data of the OCR sheet are received as pieces of image data, and the image data are recognized with a character recognition apparatus to convert the image data into pieces of code data, and the code data are input to the host computer.

In a current art, the image data are not recognized with the character recognition apparatus with an accuracy of 100%. In other words, there is a possibility that the image data are erroneously recognized, so that the code data in which one or more data erroneously recognized are included at some possibility are input to the host computer. In the host computer, the code data including the erroneous data at some possibility are converted into pieces of reproduced image data indicating pieces of reproduced order data, and the reproduced image data are transmitted to the order terminal side according to the facsimile communication. Thereafter, the reproduced image data are checked at the order terminal side. In case where one or more pieces of erroneous data are found in the reproduced image data, the order terminal side requests the order-receiving center to correct the erroneous data. Thereafter, at the order-receiving center, pieces of corrected code data are manually input to the host computer through the keyboard or are manually written in a correcting input sheet to input the corrected code data in the host computer.

2.2. PROBLEMS TO BE SOLVED BY THE INVENTION

However, there is a drawback that the work for checking the reproduced image data at the order terminal side and manually inputting or writing the corrected code data at the order-receiving center is troublesome.

To solve the drawback, one or more order items are written in an OCR document sheet at the order terminal side, a character recognition of the order items are performed with a character recognition apparatus at the order terminal side to convert the order items into pieces of image data, an operator corrects one or more errors in cases where he finds out the errors from the image data, and the image data corrected are transmitted to the order-receiving center.

In this case, a format of the OCR document sheet is often modified according to the variation of the orders for the purpose of being easily used or because of the modification of intended purposes. That is, various types of OCR document sheets are actually utilized in each of a plurality of order terminal sides to process many types of orders. Therefore, it is required to rapidly obtain an updated type of OCR document sheet actually required in each of the order terminal sides.

Also, it is required for each of the order terminal sides to provide with a basic processing program used for performing the character recognition for the types of OCR document sheets and pieces of OCR sheet format information used for respectively detecting one or more handwritten character regions of one type of OCR document sheet in which the order items are handwritten. In this case, because various types of OCR document sheets are actually utilized in each of a plurality of order terminal sides, it is required to store not only a plurality of basic processing program but also pieces of OCR sheet format information in a memory of each order terminal side. Therefore, there is another drawback that it is required to provide a memory having a large capacity for each of the order terminal sides. Also, it is required that the OCR sheet format information are modified for each of the order terminal sides. Therefore, it is impossible to modify the OCR sheet format information required in the order terminal sides.

SUMMARY OF THE INVENTION

A first object of the present invention is to provide, with due consideration to the first drawback of such a conventional facsimile apparatus and a conventional communication system, a facsimile apparatus and a communication apparatus in which various types of OCR document sheets are used at each of the order terminal sides without using a memory having a large capacity, and in which the formats of the OCR document sheets are easily modified for each of the order terminal sides.

A second object of the present invention is to provide a communication system in which a type of OCR document sheet required in each of the order terminal sides is easily selected and the type of OCR document sheet selected is rapidly obtained in each of the order terminal sides.

The first object is achieved by the provision of a facsimile apparatus for communicating with a center apparatus, comprising:

a read only memory for storing an OCR sheet recognizing program utilized to recognize contents written in an OCR document sheet as one or more characters;

information receiving means for receiving a piece of OCR sheet identifying information transmitted from the center apparatus, the OCR sheet identifying information being utilized to identify a format of the OCR document sheet;

a static random access memory for temporarily storing the OCR sheet identifying information received by the information receiving means;

a nonvolatile memory for storing the OCR sheet identifying information stored in the static random access memory;

memory control means for transmitting the OCR sheet identifying information from the static random access memory to the nonvolatile memory;

reading means for reading the contents written in the OCR document sheet; and character recognizing means for recognizing the contents read by the reading means as one or more characters according to the OCR sheet identifying information stored in the nonvolatile memory and the OCR sheet recognizing program stored in the read only memory.

In the above configuration, an OCR sheet recognizing program is stored in the read only memory in advance. Also, a piece of OCR sheet identifying information is transmitted from the center apparatus to the information receiving means and is temporarily stored in the static random access memory. In this case, a writing operation of a piece of data to the static random access memory can be performed at a high speed as is well known. Therefore, the transmission of the OCR sheet identifying information from the center apparatus to the static random access memory can be performed at a high speed. Accordingly, a time required for the connection of the facsimile apparatus and the center apparatus can be shortened.

Thereafter, the OCR sheet identifying information is transmitted to the nonvolatile memory under the control of the memory control means. As is well known, a piece of data stored in the nonvolatile memory is not lost even though an electric supply to the nonvolatile memory is cut off. Therefore, the OCR sheet identifying information can be reliably stored in the nonvolatile memory as compared with that stored in the static random access memory.

Thereafter, contents written in an OCR document sheet is read by the reading means and are recognized as one or more characters by the character recognizing means according to the OCR sheet identifying information and the OCR sheet recognizing program stored in the read only memory.

Accordingly, even though a format of the OCR document sheet is modified, because the OCR document sheet identifying information is transmitted from the center apparatus to the facsimile apparatus, various types of OCR document sheets can be used at each of the order terminal sides without using a memory having a large capacity, and the formats of the OCR document sheets are easily modified for each of the order terminal sides.

The first object is also achieved by the provision of a facsimile apparatus for communicating with a center apparatus, comprising:

a read only memory for storing an OCR sheet recognizing program utilized to recognize contents written in each of types of OCR document sheets as one or more characters;

information receiving means for receiving a piece of OCR sheet identifying information and one or more pieces of format information transmitted from the center apparatus, the OCR sheet identifying information being utilized to identify a plurality of formats of the types of OCR document sheets, and the format information relating to the types of OCR document sheets in one-to-one correspondence;

a static random access memory for temporarily storing the OCR sheet identifying information and the format information received by the information receiving means;

a nonvolatile memory for storing the OCR sheet identifying information and the format information stored in the static random access memory;

memory control means for transmitting the OCR sheet identifying information and the format information from the static random access memory to the nonvolatile memory;

reading means for reading the contents written in a type of particular OCR document sheet; and character recognizing means for recognizing the contents read by the reading means as one or more characters according to the OCR sheet identifying information stored in the nonvolatile memory and the OCR sheet recognizing program stored in the read only memory.

In the above configuration, the OCR sheet recognizing program and the OCR sheet identifying information are stored in the same manner. Also, pieces of format information are transmitted from the center apparatus and are stored in the same manner as the OCR sheet identifying information. Each of the format information is utilized to print out an OCR document sheet in which any contents are not written, to display the contents written in an OCR document sheet or to print out the contents written in an OCR document sheet. Therefore, the format information relate to the types of OCR document sheets in one-to-one correspondence.

Thereafter, contents written in a particular OCR document sheet is read by the reading means and are recognized as one or more characters by the character recognizing means according to the OCR sheet identifying information and the OCR sheet recognizing program stored in the read only memory. Thereafter, the contents recognized are displayed or printed out according to a piece of format information corresponding to the particular OCR document sheet.

The first object is also achieved by the provision of a communication system, comprising:

an OCR center apparatus for modifying a piece of OCR sheet identifying information, the OCR sheet identifying information being utilized to identify a format of an OCR document sheet;

a plurality of facsimile apparatuses for respectively communicating with the OCR center apparatus; and a plurality of communication lines for respectively connecting the OCR center apparatus and one of the facsimile apparatuses, each of the facsimile apparatuses comprising a read only memory for storing an OCR sheet recognizing program utilized to recognize contents written in the OCR document sheet as one or more characters, information receiving means for receiving the OCR sheet identifying information transmitted from the center apparatus, a static random access memory for temporarily storing the OCR sheet identifying information received by the information receiving means, a nonvolatile memory for storing the OCR sheet identifying information stored in the static random access memory, and memory control means for transmitting the OCR sheet identifying information from the static random access memory to the nonvolatile memory.

In the above configuration, when the modification of an OCR document sheet is required at an order terminal side, a piece of OCR sheet identifying information is modified in the center apparatus and is transmitted to the facsimile apparatus. In the facsimile apparatus, the OCR sheet identifying information is temporarily stored in the static random access memory and is transmitted to the nonvolatile memory under the control of the memory control means.

Accordingly, even though a modified format of the OCR document sheet is required at an order terminal side, because the OCR document sheet identifying information modified is transmitted from the center apparatus to the facsimile apparatus, various types of OCR document sheets can be used at each of the order terminal sides without using a memory having a large capacity. Also, the formats of the OCR document sheets are easily modified for each of the order terminal sides.

The first object is also achieved by the provision of a communication system, comprising:

an OCR center apparatus for modifying a piece of OCR sheet identifying information and one or more pieces of format information, the OCR sheet identifying information being utilized to identify a plurality of formats of types of OCR document sheets, and the format information relating to the types of OCR document sheets in one-to-one correspondence;

a plurality of facsimile apparatuses for respectively communicating with the OCR center apparatus; and a plurality of communication lines for respectively connecting the OCR center apparatus and one of the facsimile apparatuses, each of the facsimile apparatuses comprising a read only memory for storing an OCR sheet recognizing program utilized to recognize contents written in each of types of OCR document sheets as one or more characters;

information receiving means for receiving the OCR sheet identifying information and the format information transmitted from the center apparatus;

a static random access memory for temporarily storing the OCR sheet identifying information and the format information received by the information receiving means;

a nonvolatile memory for storing the OCR sheet identifying information and the format information stored in the static random access memory; and memory control means for transmitting the OCR sheet identifying information and the format information from the static random access memory to the nonvolatile memory.

In the above configuration, when the modification of an OCR document sheet is required at an order terminal side, a piece of OCR sheet identifying information and one or more pieces of format information are modified in the center apparatus and are transmitted to the facsimile apparatus. In the facsimile apparatus, the OCR sheet identifying information and the format information are temporarily stored in the static random access memory and are transmitted to the nonvolatile memory under the control of the memory control means. Each of the format information is utilized to print out an OCR document sheet in which any contents are not written, to display the contents written in an OCR document sheet or to print out the contents written in an OCR document sheet. Therefore, the format information relate to the types of OCR document sheets in one-to-one correspondence.

Accordingly, even though a modified format of the OCR document sheets is required at an order terminal side, because the OCR document sheet identifying information and the format information modified are transmitted from the center apparatus to the facsimile apparatus, various types of OCR document sheets modified can be used at each of the order terminal sides without using a memory having a large capacity. Also, the formats of the OCR document sheets are easily modified for each of the order terminal sides.

The second object is achieved by the provision of a communication system, comprising:

an OCR center apparatus for transmitting a piece of image information and a piece of OCR recognition information corresponding to a type of OCR document sheet;

a plurality of facsimile apparatuses for respectively receiving the image information and the OCR recognition information transmitted from the OCR center apparatus;

a plurality of communication lines for respectively connecting the OCR center apparatus and one of the facsimile apparatuses to transmit the image information and the OCR recognition information from the OCR center apparatus to one of the facsimile apparatuses, each of the facsimile apparatuses comprising a first memory for storing the image information, a printer for printing out the type of OCR document sheet according to the image information stored in the first memory, an order being written in the type of OCR document sheet by an operator, a second memory for storing the OCR recognition information, and a character recognizing unit for recognizing the order which are written in the type of OCR document sheet printed out in the printer according to the OCR recognition information stored in the second memory.

In the above configuration, a piece of OCR recognition information is down-loaded from the center apparatus to each of the facsimile apparatuses through a communication line, and a piece of image information corresponding to a type of OCR document sheet is transmitted from the center apparatus to each of the facsimile apparatuses through a communication line in a facsimile communication.

In each of the facsimile apparatuses, the image information is stored in the first memory, and the OCR recognition information is stored in the second memory. Thereafter, the type of OCR document sheet is printed out according to the image information. Accordingly, an operator can easily obtain the type of OCR document sheet to write an order in the type of OCR document sheet.

Thereafter, the order written in the type of OCR document sheet is recognized according to the OCR recognition information.

The second object is also achieved by the provision of a communication system, comprising:

an OCR center apparatus for transmitting a piece of image information a piece of OCR recognition information and a piece of entry advice information respectively corresponding to a type of OCR document sheet;

a plurality of facsimile apparatuses for respectively receiving the image information, the entry advice information and the OCR recognition information transmitted from the OCR center apparatus;

a plurality of communication lines for respectively connecting the OCR center apparatus and one of the facsimile apparatuses to transmit the image information, the entry advice information and the OCR recognition information from the OCR center apparatus to one of the facsimile apparatuses, each of the facsimile apparatuses comprising a first memory for storing the image information and the entry advice information, a printer for printing out the type of OCR document sheet according to the image information and the entry advice information stored in the first memory, an order being written in the type of OCR document sheet by an operator while referring the entry advice information, a second memory for storing the OCR recognition information, and a character recognizing unit for recognizing the order which are written in the type of OCR document sheet printed out in the printer according to the OCR recognition information stored in the second memory.

In the above configuration, not only the image information but also the entry advice information are transmitted to each of the facsimile apparatuses, and the entry advice information is printed in a type of OCR document sheet. Therefore, an operator can write an order in the type of OCR document sheet while referring the entry advice information. Accordingly, the operator can rapidly and easily write the order in the type of OCR document sheet.

The second object is also achieved by the provision of a communication system, comprising:

an OCR center apparatus for transmitting a recognition information menu of pieces of OCR recognition information corresponding to a plurality of types of OCR document sheet;

a plurality of facsimile apparatuses for respectively selecting a piece of particular OCR recognition information corresponding to a particular type of OCR document sheet from the recognition information menu transmitted from the OCR center apparatus and respectively receiving the particular OCR recognition information and a piece of image information corresponding to the particular type of OCR document sheet from the OCR center apparatus;

a plurality of communication lines for respectively connecting the OCR center apparatus and one of the facsimile apparatuses to transmit the recognition information menu, the particular OCR recognition information and the image information from the OCR center apparatus to one of the facsimile apparatuses, each of the facsimile apparatuses comprising a first memory for storing the image information, a printer for printing out the particular type of OCR document sheet according to the image information stored in the first memory, an order being written in the particular type of OCR document sheet by an operator, a second memory for storing the particular OCR recognition information, and a character recognizing unit for recognizing the order which are written in the particular type of OCR document sheet printed out in the printer according to the particular OCR recognition information stored in the second memory.

In the above configuration, a piece of recognition information menu is transmitted from the center apparatus to each of the facsimile apparatuses, and a piece of particular OCR recognition information corresponding to a particular type of OCR document sheet is selected, and stored in the second memory. Thereafter, the particular OCR recognition information and a piece of image information corresponding to the particular type of OCR document sheet are transmitted from the center apparatus to each of the facsimile apparatuses. The particular OCR recognition information is stored in the second memory, and the image information is stored in the first embodiment.

Thereafter, the particular type of OCR document sheet desired by the operator is printed out according to the image information. Thereafter, the order written in the particular type of OCR document sheet is recognized according to the particular OCR recognition information.

Accordingly, an operator can easily obtain the particular type of OCR document sheet to write an order in the particular type of OCR document sheet.

Also, because it is not required to transmit pieces of OCR recognition information and pieces of image information corresponding to other types of OCR document sheets other than the particular type of OCR document sheet, the image information required to print out the particular type of OCR document sheet can be efficiently transmitted to each of the facsimile apparatuses, and the particular OCR recognition information required to recognize the order written in the particular type of OCR document sheet can be efficiently transmitted to each of the facsimile apparatuses. Therefore, an amount of the communication between the center and facsimile apparatuses can be reduced.

It is preferred that the particular OCR recognition information be abandoned in the middle of the storage of the particular OCR recognition information in case where a remaining storage capacity of the second memory is short to store all of the particular OCR recognition information or a communication error occurs, and the transmission of the image information to each of the facsimile apparatuses be stopped.

Because the particular OCR recognition information stored in the second memory is useless in case where the second memory is full with the particular OCR recognition information or a communication error occurs in the middle of the storage of the particular OCR recognition information, the particular OCR recognition information be abandoned. Also, because the image information corresponding to the particular type of OCR document sheet is not required, the transmission of the image information to each of the facsimile apparatuses is stopped.

Accordingly, a wasteful transmission of the image data can be prevented.

Also, it is preferred that each of the facsimile apparatuses further comprise a display for displaying a piece of selection advice information transmitted from the center apparatus to select the particular OCR recognition information.

Because a piece of selection advice information is transmitted from the center apparatus and is displayed in the display of each of the facsimile apparatuses, the operator can easily select the particular OCR recognition information.

Also, it is preferred that the selection advice information be composed of a plurality of pieces of article selection advice information utilized to respectively select an article and a plurality of group selection advice information utilized to respectively select a plurality of articles registered in an article group.

Because the article selection advice information are displayed, one or more articles can be respectively selected. Also, because the group selection advice information are displayed, a plurality of articles can be selected in a group.

The second object is also achieved by the provision of a communication system, comprising:

an OCR center apparatus for transmitting a piece of image information and a piece of OCR recognition information respectively corresponding to a type of OCR document sheet;

a plurality of facsimile apparatuses for respectively receiving the OCR recognition information transmitted from the OCR center apparatus and respectively receiving the image information transmitted from the OCR center apparatus on condition that the OCR recognition information is successfully received;

a plurality of communication lines for respectively connecting the OCR center apparatus and one of the facsimile apparatuses to transmit the image information and the OCR recognition information from the OCR center apparatus to one of the facsimile apparatuses, each of the facsimile apparatuses comprising a first memory for storing the image information, a printer for printing out the type of OCR document sheet according to the image information stored in the first memory, an order being written in the type of OCR document sheet by an operator, a second memory for storing the OCR recognition information, and a character recognizing unit for recognizing the order which are written in the type of OCR document sheet printed out in the printer according to the OCR recognition information stored in the second memory.

In the above configuration, the image information is transmitted from the center apparatus to each of the facsimile apparatuses after the OCR recognition information is successfully received. Therefore, in case where the OCR recognition information is not successfully received in a facsimile apparatus, a wasteful transmission of the image data to the facsimile apparatus can be prevented.

The second object is also achieved by the provision of a communication system, comprising:

an OCR center apparatus for transmitting a piece of OCR recognition information corresponding to a type of OCR document sheet;

a plurality of facsimile apparatuses for respectively receiving the OCR recognition information transmitted from the OCR center apparatus;

a plurality of communication lines for respectively connecting the OCR center apparatus and one of the facsimile apparatuses to transmit the OCR recognition information from the OCR center apparatus to one of the facsimile apparatuses, each of the facsimile apparatuses comprising a memory for storing the OCR recognition information, a printer for printing out the type of OCR document sheet according to the OCR recognition information stored in the memory, an order being written in the type of OCR document sheet by an operator, and a character recognizing unit for recognizing the order which are written in the type of OCR document sheet printed out in the printer according to the OCR recognition information stored in the memory.

In the above configuration, the information transmitted from the center apparatus to a facsimile apparatus is limited to the OCR recognition information. Therefore, an amount of the communication between the center apparatus to the facsimile apparatus can be reduced.

It is preferred that each of the facsimile apparatuses further comprising:

a format information storing unit for storing a piece of entry advice information in which a plurality of articles are arranged;

a frequency table producing unit for producing a frequency table in which the articles are registered in the order of frequency in use; and a memory control unit for rearranging the articles of the entry advice information stored in the format information storing unit in the order of frequency in use according to the frequency table produced in the frequency table producing unit, the entry advice information being written in the type of OCR document sheet in the printer.

In the above configuration, a frequency table in which a plurality of articles are registered in the order of frequency is produced in the frequency table producing unit, and the articles of the entry advice information are rearranged in the order of frequency in use according to the frequency table under the control of the memory control unit. Thereafter, when the type of OCR document sheet is printed out in the printer, the articles of the entry advice information are additionally written in the type of OCR document sheet.

Accordingly, the operator can easily select one or more articles, and the selected articles can be written in the type of OCR document sheet as the order in correct.

BRIEF DESCRIPTION OF THE DRAWINGS

The objects, features and advantages of the present invention will be apparent from the following description taken in conjunction with the accompanying drawings, in which:

FIG. 3 shows an example of an OCR document sheet according to the first embodiment;

FIG. 4 shows an example of an optical character recognized result of numerals displayed on a display shown in FIG. 2;

FIG. 5A shows a code conversion table (No. 1) of OCR sheet format information stored in a format information storing unit shown in FIG. 2;

FIG. 5B shows a code conversion table (No. 2) of the OCR sheet format information stored in the format information storing unit;

FIG. 6 shows an example of a piece of display format information of the OCR sheet format information stored in the format information storing unit;

FIG. 16 shows a part of OCR document sheet utilized as a shipping sheet of flower according to the second embodiment;

FIG. 17A shows a frequency table produced in a frequency table producing unit shown in FIG. 15;

FIG. 17B shows a code conversion table between a group of the flower names and a group of the article codes;

FIG. 20A shows a management table stored in the center apparatus;

FIG. 20B shows an article menu of the format information received in each of the facsimile apparatuses;

FIG. 21 shows a piece of selection advice information displayed in the display to select an article group;

FIG. 22 shows a procedure of a format information communication performed according to a pulse-code (PC) modem communication;

FIG. 23 shows a procedure of a normal facsimile communication in which pieces of image information of the OCR document sheet corresponding to the particular format information selected is transmitted from a facsimile modem of the center apparatus to the facsimile apparatus;

DESCRIPTION OF THE PREFERRED EMBODIMENTS

A first embodiment of a facsimile apparatus and a communication system according to the present invention is described with reference to drawings to solve the first object.

Figure 1:
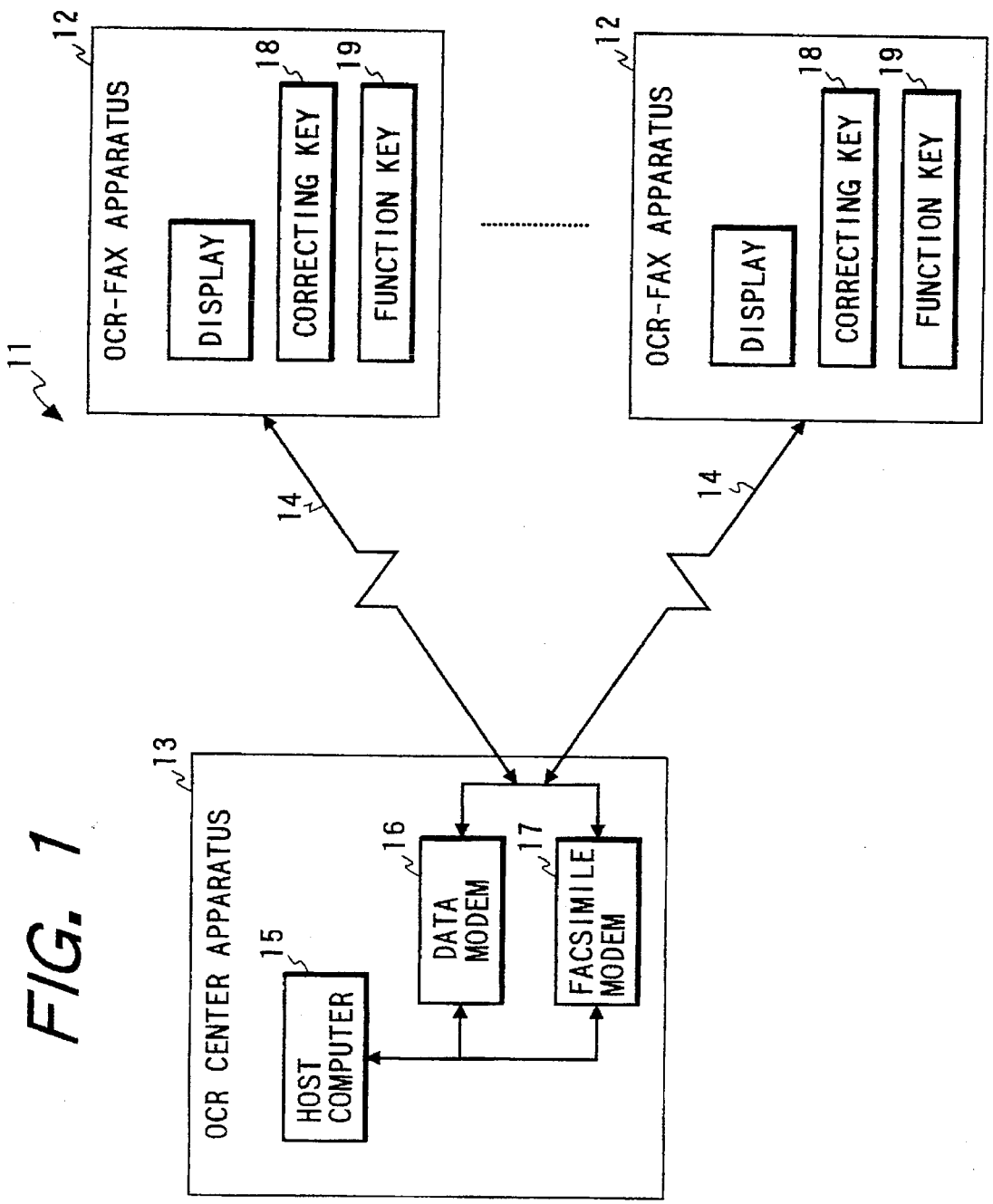
FIG. 1 is a block diagram of a communication system according to a first embodiment of the present invention.

FIG. 1 is a block diagram of a communication system according to a first embodiment of the present invention.

As shown in FIG. 1, a communication system 11 comprises a plurality of optical character recognition (OCR)-facsimile (FAX) apparatuses 12 placed at a plurality of order terminal sides, and an OCR center apparatus 18 which is placed at an order-receiving center and is connected to the OCR-FAX apparatuses 12 through a plurality of communication lines 14. Each of the OCR-FAX apparatuses 12 has an OCR function for recognizing pieces of entry information written in an OCR document sheet to convert the entry information into pieces of character recognized data, a facsimile communication function for facsimile-transmitting pieces of image data read from a facsimile manuscript to the OCR center apparatus 1B and receiving the image data transmitted from the apparatus and a data communication function for transmitting various types of code data including the character recognized data to the center apparatus 13 and receiving the code data transmitted to the center apparatus Each of the OCR-FAX apparatuses 12 is provided with a display for displaying the character recognized data, a correcting key 18 for correcting the character recognized data in case where a transmitter finds out one or more errors from the character recognized data which indicate the entry information such as contents of an order, and a function key 19 for switching from an operation such as a display operation, a print operation, a transmission operation or the like to another operation.

The OCR center apparatus 13 comprises a host computer 15 having a facsimile function and a data communication function, a data modem 16 for modulating and demodulating pieces of code data transmitted between the OCR-FAX apparatuses 12 and the host computer 15, and a facsimile modem 17 for modulating and demodulating pieces of of image data transmitted between the OCR-FAX apparatuses 12 and the host computer 15. In the host computer 18 of the center apparatus 13, a plurality of orders transmitted from each of the OCR-FAX apparatuses 12 as the code data are stored in tabular form, the orders are returned to the OCR-FAX apparatuses 12 through the data modem 16 to confirm the orders in each of the OCR-FAX apparatuses 12, and pieces of OCR sheet format information of the OCR document sheet are altered or newly produced. The OCR sheet format information are down-loaded to the OCR-FAX apparatuses 12 through the data modem 16.

Each of the OCR-FAX apparatuses 12 is, for example, placed at a branch office or a business office of an order terminal side.

Figure 2:
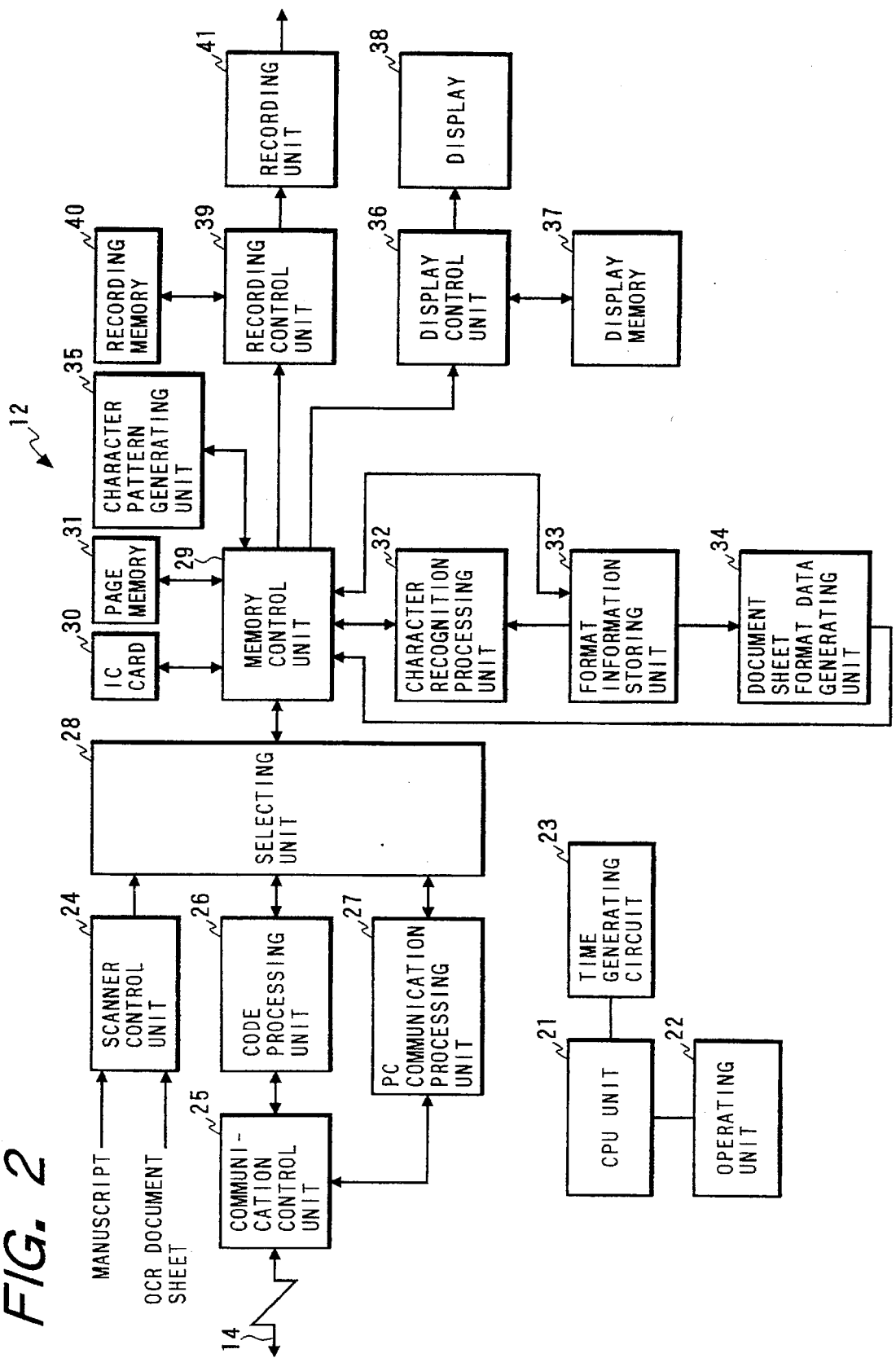
FIG. 2 is a block diagram showing the configuration of each of OCR-FAX apparatuses shown in FIG. 1.

FIG. 2 is a block diagram showing the configuration of each of the OCR-FAX apparatuses 12.

As shown in FIG. 2, the facsimile apparatus 12 comprises a central processing unit (CPU) 21 for controlling all of units in the apparatus 12, an operating unit 22 such as a keyboard having the correcting key 18 and the function key 19 for inputting various types of data and instructions to perform the correction of the image data obtained by the character recognition, the transmission of the image data, the display of the image data on a display, and the print of the image data, a time generating circuit 23 for supplying pieces of time information required to display various types of times such as a transmitted date, a transmitted time, a producing time of each OCR document sheet and the like, a scanner control unit 24 for controlling a scanner to read contents of a facsimile manuscript or contents of an order written in each of types of OCR document sheets and obtaining pieces of facsimile data of the contents of the facsimile manuscript or obtaining the image data of the contents of the order, a communication control unit 25 for selecting one modem from among a facsimile modem and a data modem (a pulse-code modem) according to pieces of data transmitted from/to the center apparatus 13 and for controlling the transmission of the data, a code processing unit 26 for compressing the facsimile data obtained in the scanner controlling unit 24 to transmit to the center apparatus 13 through the facsimile modem of the communication control unit 25 and expanding pieces of facsimile data received from the center apparatus 13 through the facsimile modem, a pulse-code (PC) communication processing unit 27 for processing the communication of pieces of code data transmitted between the center apparatus 28 and the facsimile apparatus 12 through the data modem of the communication control unit 25, and a selecting unit 28 for selecting an output or input from/to one unit from those of the scanner control unit 24, the PC communication processing unit 25 and the code processing unit 26.

The facsimile apparatus 12 further comprises a memory control unit 29 for controlling pieces of data which are input to be stored in one of storing units or are output from one of the storing units, an integrated circuit (IC) card 30 for storing a plurality of OCR document sheet recognizing programs which each are composed of a basic program used for a plurality types of OCR document sheets in common and a subordinate program used for a type of OCR document sheet, pieces of OCR document sheet identifying information utilized to identify the types of the OCR document sheets, a page memory 31 for storing the image data obtained in the scanner control unit 24, storing pieces of character recognized data obtained from the image data as the code data according to an optical character recognition, and a plurality of strains of fixed characters such as "order code", "order date", "commodity codes", "number or quantity", "commodity names" and "the number of ordered commodities" which support the realization of the character recognized data displayed or printed, and a character recognition processing unit 32 for loading the OCR document sheet recognizing program and the OCR document sheet identifying information stored in the IC card 30, reading out the image data stored in the page memory 31, performing the optical character recognition according to the OCR document sheet recognizing program and the OCR document sheet identifying information loaded to convert the image data into the character recognized data, and transmitting the character recognized data to the page memory 31.

The facsimile apparatus 12 further comprises a format information storing unit 33 for storing pieces of OCR sheet format information used for printing out the types of OCR document sheets in which any order is not written, pieces of display format information used for displaying the types of OCR document sheets, pieces of print format information used for printing out the types of OCR document sheets and a plurality of code conversion tables for the types of OCR document sheets which are down-loaded from the center apparatus 13 and are transmitted through the PC communication processing unit 27 as the code data, a document sheet format data generating unit 34 for generating pieces of document sheet format data required to print each of the types of OCR document sheets, a character pattern generating unit 35 for generating strains of converted characters respectively expressing the meaning of the character recognized data, a display control unit 36 for controlling the display of the character recognized data stored in the page memory 31 according to the display format information stored in the format information storing unit 33, a display memory 37 for storing the character recognized data under the control of the display control unit 36, a display 38 for displaying the character recognized data stored in the display memory 37, the strains of fixed characters stored in the page memory 31 and the strains of converted characters generated by the character pattern generating unit 35, a recording control unit 39 for controlling the print of the character recognized data stored in the page memory 31 according to the print format information stored in the format information storing unit 33, a record memory 40 for storing the character recognized data under the control of the recording control unit 39, and a recording unit 41 such as a printer for printing the OCR document sheet, in which any order is not written, according to the document sheet format data generated in the document sheet format data generating unit 34 and for printing the character recognized data stored in the recording memory 40, a date, a time and an identification number of a transmitter to record the character recognized data transmitted to the center apparatus 13 in a recording paper.

The basic program is used to recognize the common format in the types of OCR document sheets, and each of the subordinate programs is used to recognize a peculiar format not common to the types of OCR documents. When a piece of OCR recognizing information composed of one OCR recognizing program and one OCR sheet format information is down-loaded from the OCR center apparatus 13 to the IC card 30 and format information storing unit 33 of the OCR-FAX apparatus 12, there are two types of operations. In a first type operation, the basic program and the subordinate program of the OCR recognizing program are down-loaded to the IC card 30 together. In a second type operation, the basic program of the OCR recognizing program is stored in the IC card 30 in advance, and the subordinate program of the OCR recognizing program is down-loaded to the IC card 30.

FIG. 3 shows an example of an OCR document sheet according to the first embodiment. In the first embodiment, the OCR document sheet used to order a commodity and a display image of a recognized result are described.

As shown in FIG. 3, an "order code" denotes a piece of code data for specifying an ordering person or company, and the ordering person or company writes the order code in an OCR document sheet. An "order date" indicates a transmitting date of the OCR document sheet in which contents of an order are recognized. A "commodity code" indicates a type of ordered commodity, and a "number or amount" placed at a right side of the commodity code indicates the number of ordered commodities. Numerals in the OCR document sheet are handwritten by a transmitter. The meaning of handwritten first numerals indicating the number of ordered commodities can be easily realized. In contrast, the meanings of handwritten second numerals indicating the order code, the commodity codes and the order date cannot be easily realized. In the first embodiment, the handwritten second numerals are displayed or printed out to be easily realized.

FIG. 4 shows an example of an optical character recognized result of the numerals displayed on the display 38.

As shown in FIG. 4, a strain of fixed characters (the "order code"), a piece of character recognized data ("12356") and a strain of converted characters (M electronic company, Meguro in Japan) obtained by converting the character recognized data "12356" are displayed in the display 38 as an item of the order code. A strain of fixed characters (the "order date"), a piece of character recognized data ("25") and a strain of converted characters ("October") obtained by converting the character recognized data "10" are displayed in the display 38 as an item of order date. A strain of fixed characters ("commodity codes", "commodity names" and "the number of ordered commodities"), pieces of character recognized data (commodity codes "0101", . . . ,"2801", and number or quantity codes "5", . . . ,"14") and strains of converted characters ("television", "radio", "battery", "electronic oven" and "stereo") obtained by converting the character recognized data ("0101", . . . ,"2801") are displayed in the display 33 as pieces of ordered data. The strains of fixed characters are stored in the page memory 31 in advance, and the strains of converted characters are generated in the character pattern generating unit 35. Also, the character recognized data are easily distinguished from the strains of fixed characters and the strains of converted characters by adding an identifying symbol "[]" to each of the character recognized data. The identifying symbol "[]" are generated by the character pattern generating unit 35.

Therefore, because not only the character recognized data of the handwritten numerals but also the stains of fixed characters (or headings) and the strains of converted characters are displayed with the handwritten numerals, the transmitter can promptly realize the meaning of the character recognized data displayed in the display 38.

FIG. 5A shows a code conversion table (No. 1) of the OCR sheet format information stored in the format information storing unit 33, FIG. 5B shows a code conversion table (No. 2) of the OCR sheet format information stored in the format information storing unit 33.

In FIG. 5A, the order codes and names of ordering persons or companies are shown in one-to-one correspondence. When an order code handwritten in a type of OCR document sheet is recognized as "12356" in the character recognition processing unit 32, a strain of characters "M electronic company, Meguro" is generated in the character pattern generating unit 35 according to the code conversion table shown in FIG. 5A, and the strain of characters is displayed in the display 38 or is printed out by the recording unit 41.

In FIG. 5B, the commodity codes and commodity names are are shown in one-to-one correspondence. When a commodity code handwritten in the OCR document sheet is recognized as "0101" in the character recognition processing unit 32, a strain of characters "television" is generated in the character pattern generating unit 35 according to the code conversion table shown in FIG. 5B, and the strain of characters is displayed in the display 38 or is printed out by the recording unit 41.

FIG. 6 shows an example of a piece of display format information of the OCR sheet format information stored in the IC card 30.

As shown in FIG. 6, in a first format region for the strains of fixed characters, a display starting position, a displayed data type distinguishing code and an offset of a strain of fixed characters are stored for each of the strains. The display starting position of a strain of fixed characters indicates a heading coordinates of the strain displayed in the display 38. The displayed data type distinguishing code indicates whether the character recognized data are displayed in the display 38 or pieces of returned data produced from the character recognized data in the center apparatus 13 are displayed in the display 38. The offset of a strain of fixed characters indicates a position of the strain stored in the page memory 31.

In a second format region for the character recognized data or the returned data, a display starting position, a displayed data type distinguishing code and an offset are stored for each of the character recognized data in the same manner as in the first format region. In addition, the identifying symbol "[]" and a piece of conversion information indicating whether or not a strain of converted characters obtained by converting a piece of character recognized data exists are stored for each of the character recognized data. In the second format region for the date code and the number or quantity codes, the conversion information indicates no existence of a strain of converted characters. In contrast, in the second format region for the order code and the commodity codes, the conversion information indicates the existence of a strain of converted characters. In case where the conversion information indicates the existence of a converted character, a piece of specifying information for specifying a code conversion table shown in FIG. 5A or FIG. 5B and a display starting position of a strain of converted characters are added.

Therefore, because a format of the character recognized data converted into a strain of converted characters and another format of the character recognized data not converted are stored in the same second format region and because the formats are distinguished from each other according to only the conversion information to determine whether a strain of converted characters is to be generated, the display format information can be easily prepared. The display format information prepared in the center apparatus 13 is down-loaded to the IC card 30.

Figure 7:
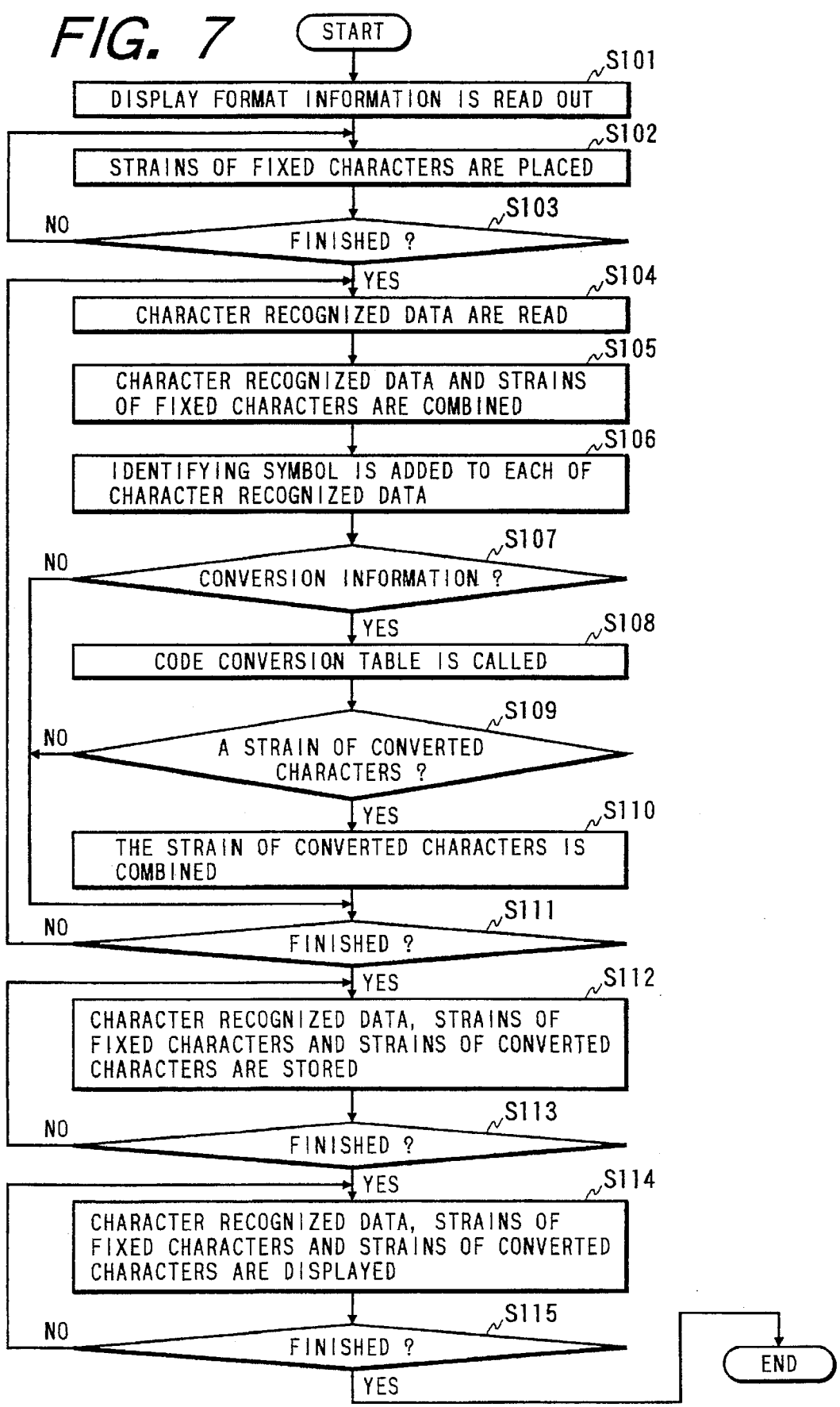
FIG. 7 shows a displaying operation for displaying the character recognized data and strains of converted characters in the display.

Next, a displaying operation for displaying the character recognized data and strains of converted characters in the display 38 is described with reference to FIG. 7.

Contents of an order written in a type of OCR document sheet are read in the scanner controlling unit 24 as pieces of image data, and the image data are stored in the page memory 31 through the selecting unit 28 and the memory control unit 29. When the reading of the contents and the storage of the image data in the page memory 31 are finished, the image data is read out to the character recognition unit 32, and an OCR operation for the image data is performed according to the OCR document sheet recognizing program and the OCR document sheet identifying information read out from the IC card 30 to convert the image data into pieces of character recognized data. That is, a piece of image data corresponding to a character is identified according to the OCR document sheet identifying information, and the image data identified is recognized as a piece of character recognized data according to the OCR document sheet recognizing program. When the OCR operation is finished, the character recognized data are stored in the page memory 31. Thereafter, as shown in FIG. 7, a piece of display format information corresponding to the type of OCR document sheet is read out from the IC card 30 to the page memory 31 under the control of the memory control unit 29 (a step S101), and a plurality of strains of fixed characters stored in the page memory 31 in advance are placed in particular areas of the page memory 31 one after another according to the display format information (a step S102). When all of the strains of fixed characters are placed in the page memory 31 (a step S103), the character recognized data stored in an area of the page memory 31 are read out under the control of the memory control unit 29 (a step S104) and are placed in prescribed areas of the page memory 31 according to the display format information to be combined with the strains of fixed characters (a step S105). Also, the identifying symbol "[]" is added at each of the character recognized data (a step S106). Thereafter, it is judged by the memory control unit 29 whether or not a piece of conversion information indicates the existence of a strain of converted characters in the second format region of the display format information (a step S107). When the conversion information indicates the existence of a strain of converted characters, the code conversion table stored in the IC card 30 is called under the control of the memory control unit 29 (a step S108). Thereafter, when a strain of converted characters corresponding to a piece of character recognized data exists, the strain of converted characters is generated in the character pattern generating unit 35 according to the code conversion table (a step S109), and the strain of converted characters is combined with a strain of fixed characters or a piece of character recognized data in the page memory 31 (a step S110). When all of strains of converted characters and all of the character recognized data are combined with the strains of fixed characters (a step S111), the character recognized data are stored in the display memory 37 to make a layout of the character recognized data agreeing with that of the contents of the order handwritten in the OCR document sheet, and the strains of converted characters and the strains of fixed characters are stored in the display memory 37 to make a connection with the character recognized data (steps S112, S113). Thereafter, the strains of converted characters, the character recognized data and the strains of fixed characters are displayed (steps S114, S115).

Next, a printing operation for printing out the character recognized data and strains of converted characters in the recording unit 41 is described with reference to FIG. 8.

Figure 8:
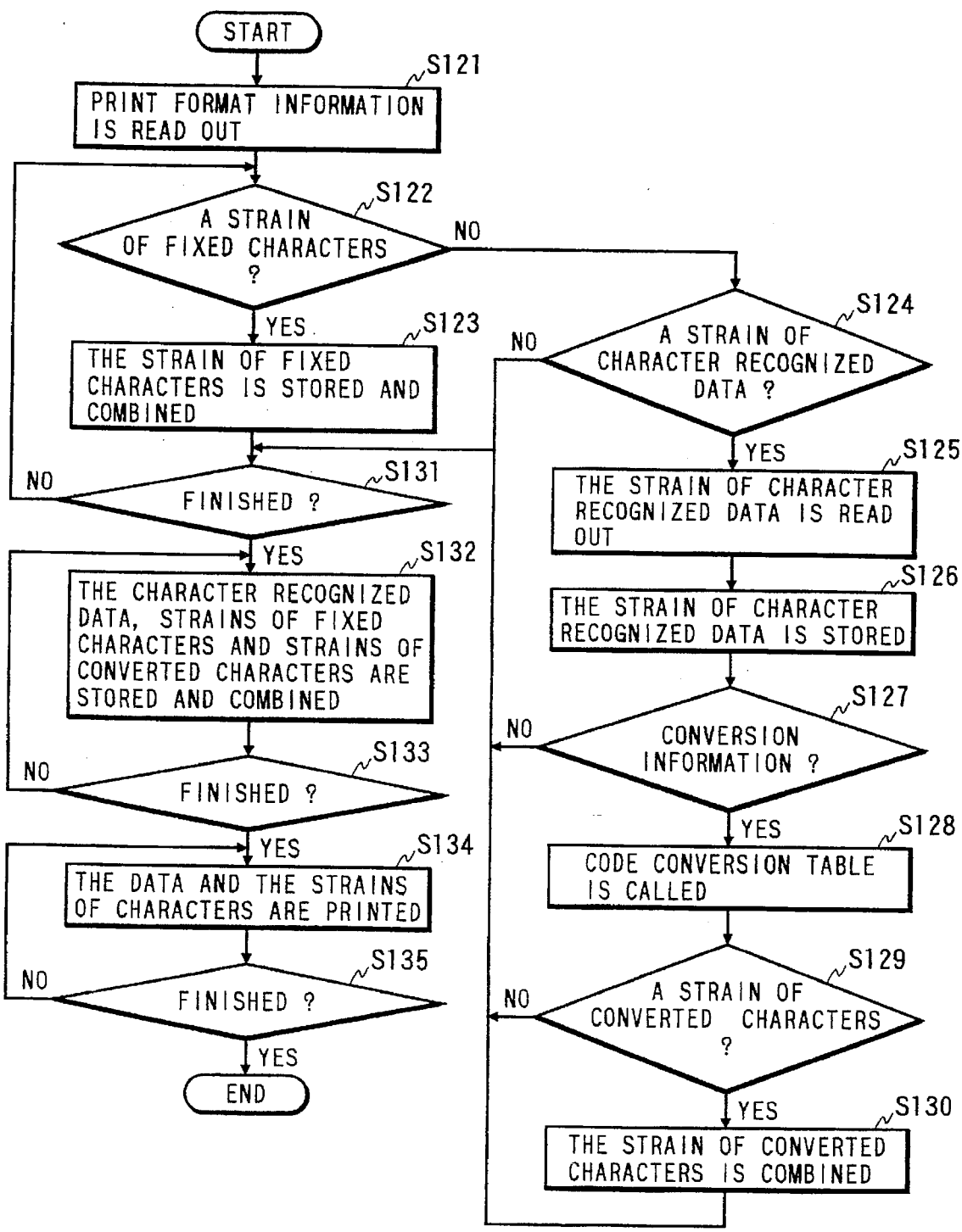
FIG. 8 shows a printing operation for printing out the character recognized data and strains of converted characters in a recording unit shown in FIG. 2.

As shown in FIG. 8, a piece of print format information corresponding to a type of OCR document sheet is read out from the format information storing unit 33 to the page memory 31 in the same manner as in the displaying operation (a step S121), and it is judged in the memory control unit 29 whether or not a format for a strain of fixed characters not transmitted to a particular region of the page memory 31 exists in the print format information (a step S112). When a format for a strain of fixed characters not transmitted to the particular region of the the page memory 31 exists, the strain of fixed characters is transmitted to the particular region (a step S123). When all of the strains of fixed characters of which the formats exist in the print format information are transmitted to the particular region of the page memory 31 in the step S122, the procedure proceeds to a step S124.

In the step S124, it is judged in the memory control unit 29 whether or not a format for a piece of character recognized data not stored in the particular region of the page memory 31 exists in the print format information. When a format for a piece of character recognized data not stored in the particular region of the page memory 31 exists, the character recognized data is transmitted to the prescribed region of the page memory 31 according to the print format information (a step S125), and the character recognized data is combined with a strain of fixed characters placed in the particular region in the step S123 (a step S126). Thereafter, it is judged according to the print format information whether or not a piece of conversion information corresponding to the character recognized data indicates the existence of a strain of converted characters (a step S127). When the conversion information indicates the existence of a strain of converted characters, the code conversion table stored in the format information storing unit 33 is called (a step S128), and it is judged whether or not a strain of converted characters corresponding to the character recognized data is registered in the code conversion table (a step S129). When a strain of converted characters corresponding to the character recognized data is registered in the code conversion table, the strain of converted characters is generated in the character pattern generating unit 3s according to the code conversion table, and the strain of converted characters is combined with a strain of fixed characters in the particular region of the page memory 31 (a step S130). When all of the character recognized data of which the formats are registered in the print format information are transmitted to the particular region of the page memory 31 in the step S124, the combination of the strains of fixed characters, the character recognized data and the strains of converted characters are finished (a step S131). Thereafter, the character recognized data are stored in the recording memory 40 to make a layout of the character recognized data agreeing with that of the contents of the order handwritten in the OCR document sheet, and the strains of converted characters and the strains of fixed characters are stored in the recording memory 40 to make a connection with the character recognized data (steps S132, S133). Thereafter, the strains of converted characters, the character recognized data and the strains of fixed characters are printed (steps S134, S135).

Figure 9:
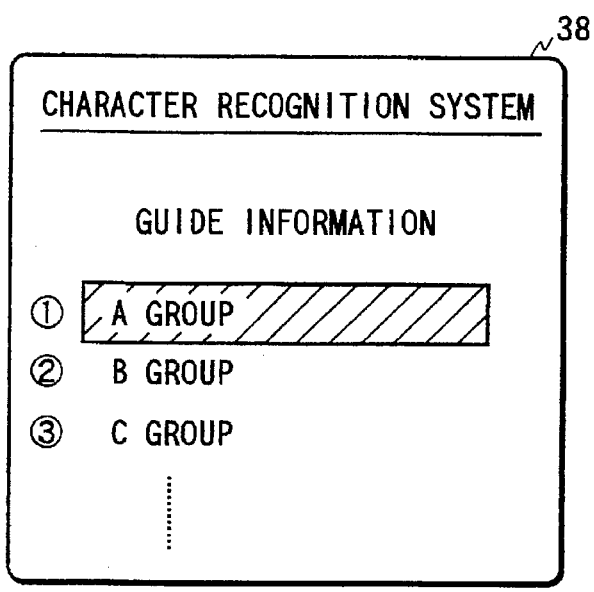
FIG. 9 shows a piece of guide information displayed in the display to select a group of sheet format information from various groups of sheet format information.
Figure 11:
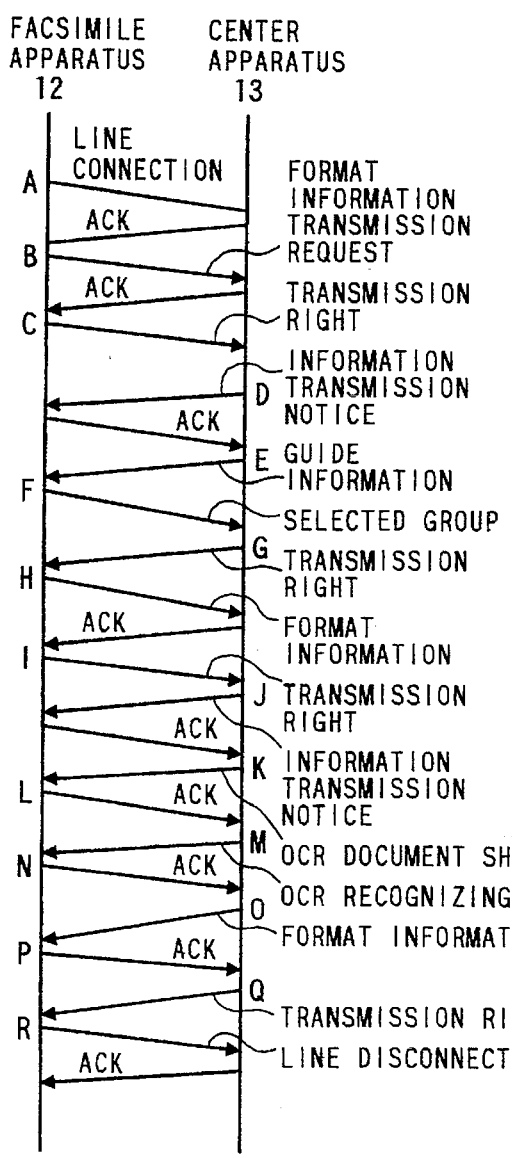
FIG. 11 shows the procedure for down-loading a group of format information selected by an operator.

Next, the selection of a group of format information composed of a piece of OCR document sheet recognizing program, a piece of OCR document sheet identifying information, a piece of OCR sheet format information, a piece of display format information, a piece of print format information and a code conversion table corresponding to a type of OCR document sheet and the transmission operation of the group of format information from the center apparatus 13 to a facsimile apparatus 12 are described with reference to FIGS. 9 and 11.

In the first embodiment, a group of format information corresponding to a type of OCR document sheet is selected in a facsimile apparatus 12 from among various groups of format information, and a piece of OCR recognizing program, a piece of OCR document sheet identifying information, a piece of OCR sheet format information, a piece of display format information, a piece of print format information and a code conversion table composing the group of format information selected are down-loaded one after another from the center apparatus 13 to the facsimile apparatus 12.

FIG. 9 shows a piece of guide information displayed in the display 38 to select a group of sheet format information from various groups of sheet format information.

As shown in FIG. 9, various groups of format information such as an A group, a B group and a C group are displayed as a piece of guide information when the transmitter operates the operating unit 22. For example, in case where an operator selects the A group of format information, a piece of OCR recognizing program, a piece of OCR document sheet identifying information, a piece of OCR sheet format information, a piece of display format information, a piece of print format information and a code conversion table corresponding to the A group of format information are down-loaded one after another from the center apparatus 13 to the facsimile apparatus 12.

Figure 10A:
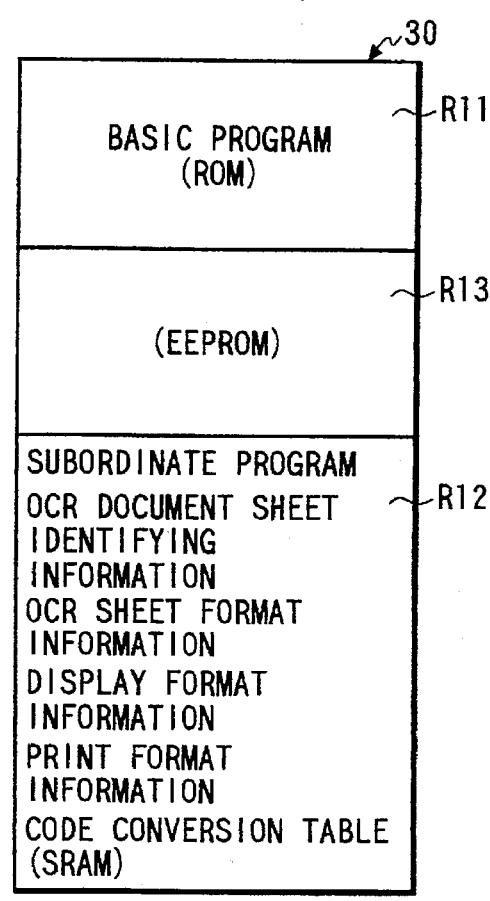
FIGS. 10A and 10B respectively show a memory configuration of the IC card.
Figure 10B:
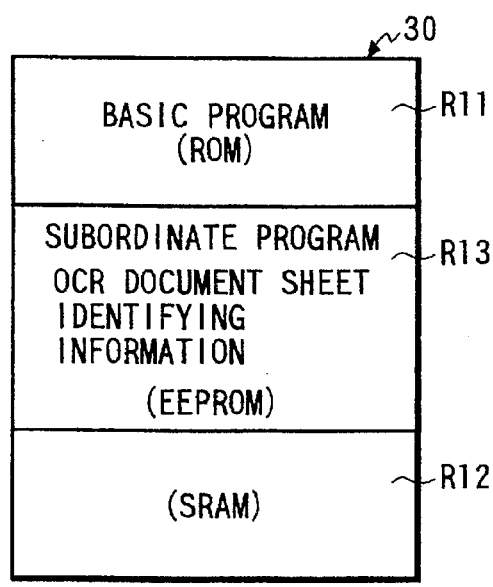

FIGS. 10A and 10B respectively show a memory configuration of the IC card 30.

As shown in FIGS. 10A and 10B, the IC card 30 is composed of a read only memory (ROM) region (or a nonvolatile flash memory region) R11, a static random access memory (SRAM) region R12 and an electrically erasable/programmable read only memory (EEPROM) region R18. Pieces of data stored in the SRAM region R12 of the IC card 30 disappear when an electric supply to the IC card 30 is cut off or the IC card 30 is pulled out from the facsimile apparatus 12, and pieces of data stored in the EEPROM region R13 or the ROM region R11 are maintained even though an electric supply to the IC card 30 is cut off.

FIG. 11 shows the procedure for down-loading a group of format information selected by the operator.

As shown in FIG. 11, a line connection between the OCR center apparatus 13 and a facsimile apparatus 12 is initially performed by the facsimile apparatus 12 (step A), and an acknowledge (ACK) signal is sent from the center apparatus 13 to the facsimile apparatus 12. Thereafter, a format information transmission request is sent from the facsimile apparatus 12 to the center apparatus 13 (step B), and an ACK signal is sent back. Thereafter, a transmission right is sent from the facsimile apparatus 12 to the center apparatus 13 (step C). Thereafter, an information transmission notice is sent from the center apparatus 13 to the facsimile apparatus 12 to inform that a selected group of format information is transmitted (step D), and an ACK signal is sent back. Thereafter, a piece of guide information shown in FIG. 9 is sent from the center apparatus 13 to the facsimile apparatus 12 (step E). Therefore, the guide information passes through the PC communication processing unit 27, the selecting unit 28, the memory control unit 29 and the display control unit 36, and the guide information is displayed in the display 38. Thereafter, a group of format information is selected from various groups of format information by the operator, and the selected group informs the center apparatus 13 (step F). Thereafter, the transmission right is sent back to the facsimile apparatus 12 (step G), a transmission request of an OCR recognizing program, a piece of OCR sheet format information, a piece of display format information, a piece of print format information and a code conversion table corresponding to the selected group of format information is sent to the center apparatus 13 (step H), and an ACK signal is sent back. Thereafter, the transmission right is sent back to the center apparatus 13 (step I), an information transmission notice is sent to the facsimile apparatus 12 (step J) to inform the apparatus 12 of the transmission of the selected group of format information, and an ACK signal is sent back. Thereafter, the OCR document sheet identifying information is are down-loaded to the facsimile apparatus 12 (step K) and is stored in the SRAM region R12 of the IC card 30, and an ACK signal is sent back (step L). The OCR document sheet identifying information is utilized to identify the type of the OCR document sheet set in the scanner control unit 24. Thereafter, the OCR recognizing program is down-loaded to the facsimile apparatus 12 (step M) and is stored in the SRAM region R12 of the IC card 30, and an ACK signal is sent back (step N). In case of the first type operation, the basic program and the subsidiary program of the OCR recognizing program are down-loaded. In case of the second type operation, the subsidiary program of the OCR recognizing program is only down-loaded. Thereafter, the OCR sheet format information, the display format information, the print format information and the code conversion table are down-loaded one after another to the facsimile apparatus 12 (step 0) and are stored in the SRAM region R12 of the IC card 30, and an ACK signal is sent back (step P). Thereafter, the transmission right is sent back to the facsimile apparatus 12 (step Q), the communication line 14 is disconnected at an order terminal side (step R), and an ACK signal is sent back.

As shown in FIG. 10A, in case of the second type operation in which the basic program is stored in advance, the basic program of the OCR recognizing program is stored in the ROM region R11, and the subordinate program of the OCR recognizing program are temporarily stored in the SRAM region R12. In contrast, in case of the first type operation in which the basic program is down-loaded, the basic program and the subordinate program of the OCR recognizing program are temporarily stored in the SRAM region R12. Also, the OCR document sheet identifying information, the OCR sheet format information, the display format information, the print format information and the code conversion table down-loaded are temporarily stored in the SRAM region R12.

Thereafter, when the selected group of format information is successfully down-loaded to the SRAM region R12 of the IC card 30, the communication line 14 is disconnected, and the OCR recognizing program and the OCR document sheet identifying information are transmitted from the SRAM region to the EEPROM region, as shown in FIG. 10B. Also, the OCR sheet format information, the display format information, the print format information and the code conversion table are transmitted to the format information storing unit 33.

Because pieces of information can be generally written in the SRAM region R12 at a high writing speed, a transmission time required to down-load the selected group of format information to the IC card 30 can be shortened. Also, because the selected group of format information is transmitted from the SRAM region to the EEPROM region R13 or the format information storing unit 33 after the communication line 14 is disconnected, a line connection time required to connect the facsimile apparatus 12 with the center apparatus 13 can be shortened, and a communication fee can be reduced. Also, because the selected group of format information is finally transmitted to the EEPROM region R13 or the format information storing unit 33, even though an electric supply to the IC card 30 is cut off or the IC card 30 is pulled out from the facsimile apparatus 12, the storage of the selected group of format information in the IC card 30 can be maintained.

Figure 12:
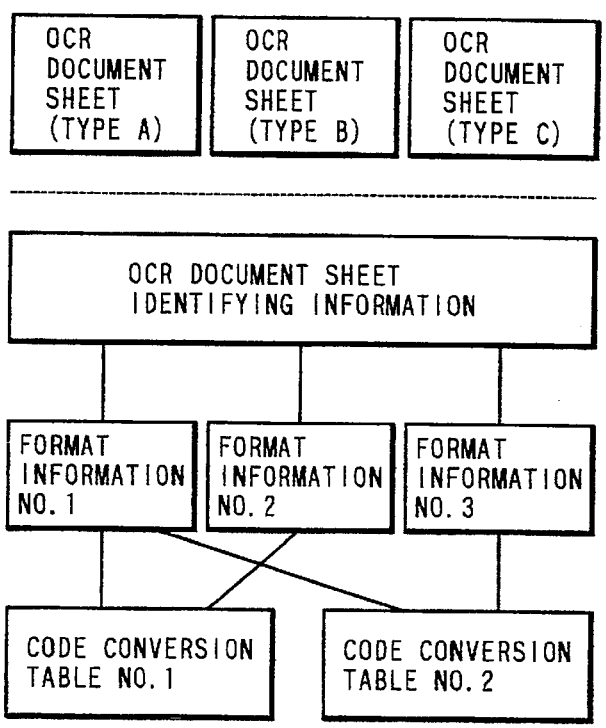
FIG. 12 shows a relationship among a group of various types of OCR document sheets, the OCR document sheet identifying information, a group of pieces of OCR sheet format information corresponding to the types of OCR document sheets and a group of code conversion tables utilized with the OCR sheet format information.

FIG. 12 shows a relationship among a group of various types of OCR document sheets, the OCR document sheet identifying information, a group of pieces of OCR sheet format information corresponding to the types of OCR document sheets and a group of code conversion tables utilized with the OCR sheet format information.

As shown in FIG. 12, the OCR document sheet identifying information is utilized to identify a plurality of formats of types of OCR document sheets set in the scanner control unit 24 for each of the facsimile apparatuses 12. A plurality of pieces of format information respectively composed of a piece of OCR sheet format information, a piece of display format information and a piece of print format information relate to a plurality of types of OCR document sheets in one-to-one correspondence. Therefore, when a format of an OCR document sheet set in the scanner control unit 24 is identified and recognized according to the OCR document sheet identifying information stored in the IC card 30, a piece of OCR sheet format information, a piece of display format information and a piece of print format information corresponding to the OCR document sheet recognized are called from the format information storing unit 33 to the character recognition processing unit 32 under the control of the memory control unit 29. The OCR sheet format information is utilized for the optical character recognition, the display format information is utilized to display the contents of the order in OCR document sheet form, and the print format information is utilized to print out the contents of the order in OCR document sheet form. Also, one or more code conversion tables corresponding to the OCR sheet format information are called from the format information storing unit 33 to the character recognition processing unit 32 under the control of the memory control unit 29 to generate one or more strains of converted characters in the character pattern generating unit 35.

Accordingly, the meaning of the character recognized data obtained according to the optical character recognition can be easily realized by referring the strains of converted characters generated in the character pattern generating unit 35 according to the code conversion tables.

Also, because a code conversion table is utilized for one or more pieces of OCR sheet format information, a storage capacity of code conversion tables required for a plurality of types of OCR document sheets can be reduced.

Figure 13:
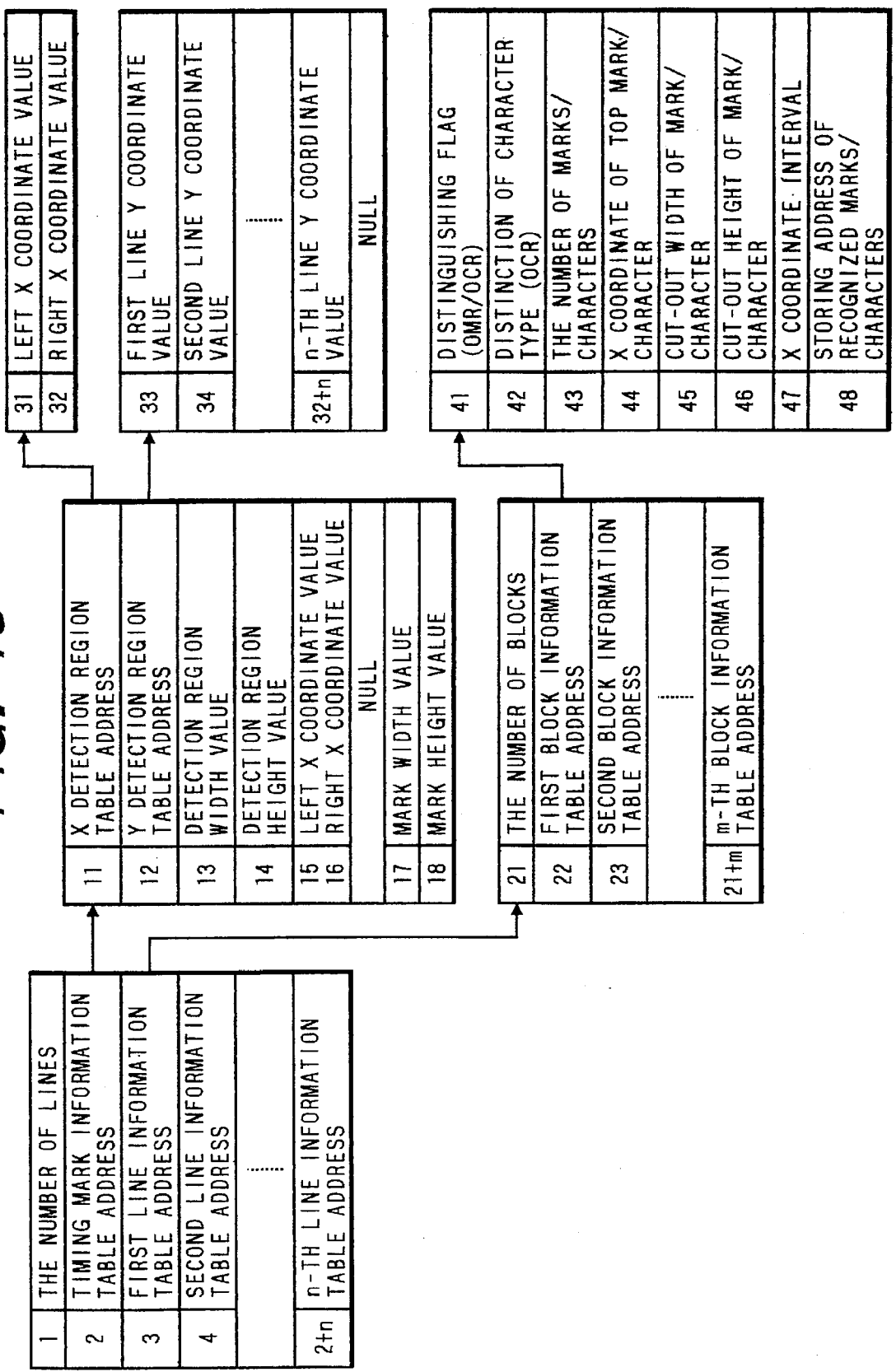
FIG. 13 shows an example of a piece of OCR sheet format information.

FIG. 13 shows an example of a piece of OCR sheet format information.

As shown in FIG. 13, a piece of basic OCR sheet format information of a piece of OCR sheet format information is composed of the number of lines in the OCR sheet format information (item 1), a timing mark information table address (item 2) for a plurality of lines of timing marks arranged in a Y direction, and i-th (i=1 to n) line information table addresses (items 3 to 2+n) for codes handwritten in an i-th line. The timing mark information table address is composed of an X detection region table address (item 11) indicating an X coordinate range of detection regions for the timing marks, and a Y detection region table address (item 12) indicating a plurality of Y coordinate ranges of the detection regions for the timing marks. Also, in the timing mark information table address, a detection region width value (item 13) for the timing marks, a detection region height value (item 14) for the timing marks, a left X coordinate value (item 15) of the timing marks, a right X coordinate value (item 16) of the timing marks, a mark width value (item 17) of the timing marks, and a mark height value (item 18) of the timing marks are written as a piece of subsidiary OCR sheet format information of the OCR sheet format information. Each of the i-th (t=1 to n) line information table addresses is composed of the number of blocks (item 21) existing in the i-th line, and j-th (j=1 to m) block information table addresses (items 22 to 21+m).

In the X detection region table address, a left X coordinate value (item 31) and a right X coordinate value (item 32) are written as the subsidiary OCR sheet format information. In the Y detection region table address, Y coordinate values (items 33 to 32+n) of the detection regions for the i-th line timing marks are written as the subsidiary OCR sheet format information.

In each of the j-th (j=1 to m) block information table addresses, a distinguishing flag (item 41) for distinguishing an optical mark recognition (OMR) and an optical character recognition (OCR), a distinction of a character type (item 42) for the OCR, the number of marks or characters (item 43), an X coordinate of a top mark or character (item 44), a cut-out width of a mark or a character (item 45), a cut-out height of a mark or a character (item 46), an X coordinate interval (item 47) and a storing address of recognized marks or characters (item 48) are written as the subsidiary OCR sheet format information.

Accordingly, even though a format of an OCR document sheet is modified, because a piece of OCR recognizing program, a piece of OCR document sheet identifying information, a piece of OCR sheet format information, a piece of display format information, a piece of print format information and a code conversion table corresponding to the OCR document sheet modified are down-loaded from the center apparatus 13 to each of the facsimile apparatuses 12 each time the format of the OCR document sheet is modified. Also, even though a new type of OCR document sheet is required from each of the facsimile apparatuses 12, various pieces of format information corresponding to the new type of OCR document sheet are immediately down-loaded from the center apparatus 13 to each of the facsimile apparatuses 12. Therefore, various types of OCR document sheets can be used at each of the order terminal sides without using a memory having a large capacity, and the formats of the OCR document sheets can be easily modified for each of the order terminal sides.

Figure 10C:
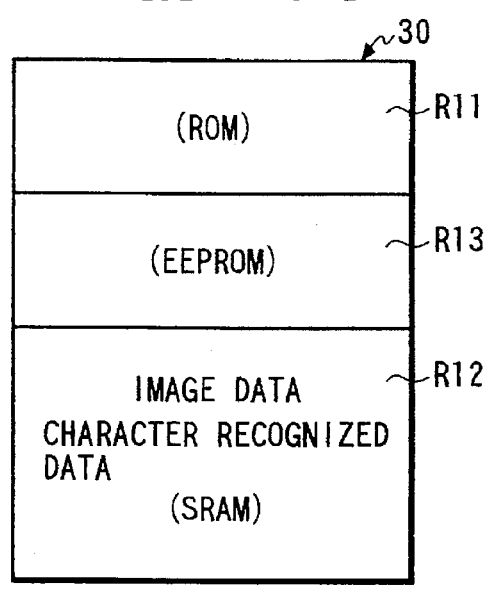
FIG. 10C shows another memory configuration of the IC card according to a modification of the first embodiment.

In the above embodiment, the image data obtained in the scanner control unit 24 and the character recognized data obtained by performing the optical character recognition in the character recognition processing unit 32 are stored in the page memory. However, as shown in FIG. 10C, it is preferred that the image data be temporarily stored in the SRAM region R12 of the IC card 30 before the image data are stored in the page memory 31. Also, it is preferred that the character recognized data be temporarily stored in the SRAM region R12 of the IC card 80 before the character recognized data are stored in the page memory 31. In this case, a reading operation for reading contents written in an OCR document sheet can be performed at a high speed. Also, an optical character recognition operation in the character recognition processing unit 32 can be performed at a high speed.

Next, a second embodiment of a facsimile apparatus and a communication system according to the present invention is described with reference to drawings to solve the second object.

Figure 14:
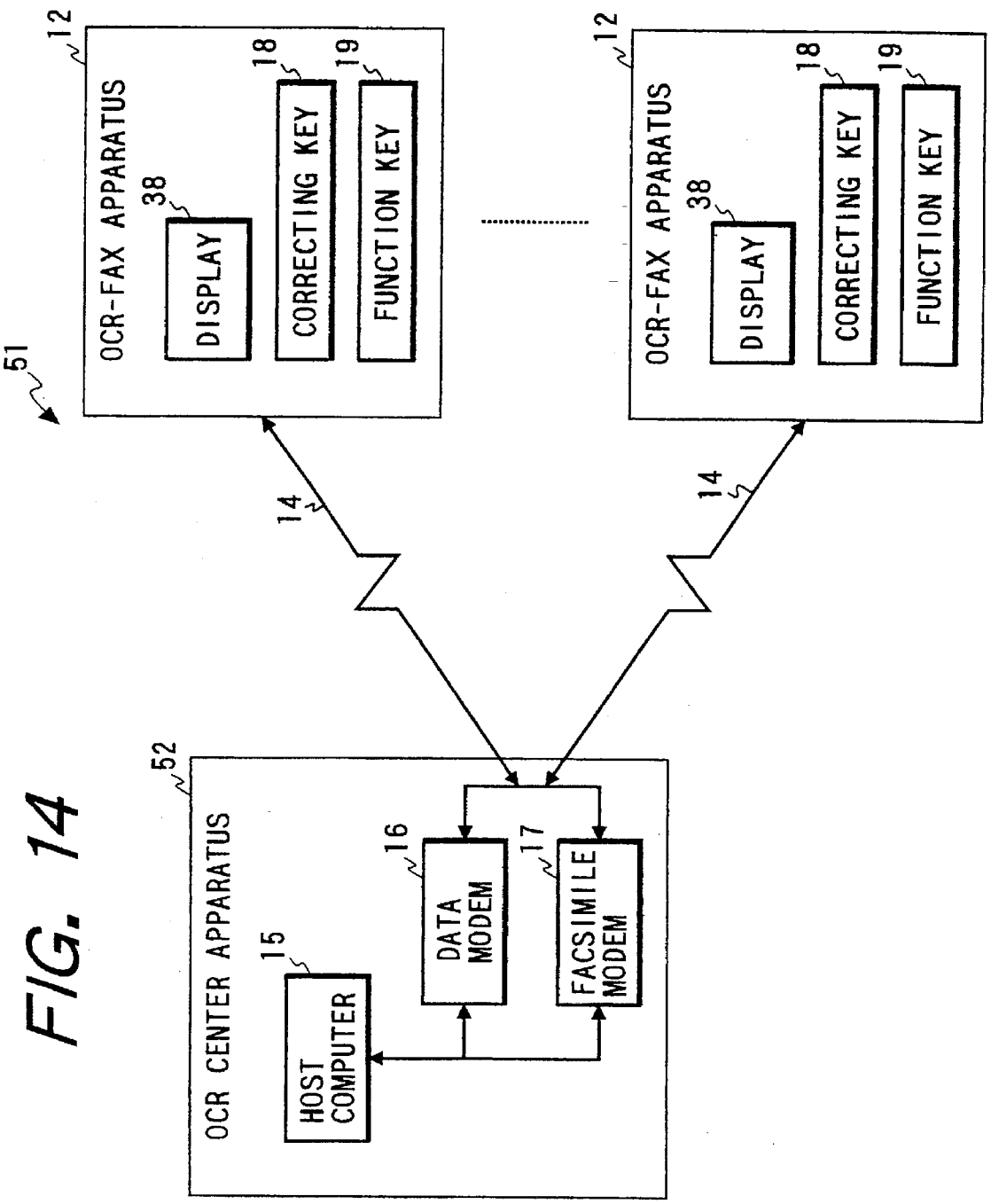
FIG. 14 is a block diagram of a communication system according to a second embodiment of the present invention.

FIG. 14 is a block diagram of a communication system according to a second embodiment of the present invention.

As shown in FIG. 14, a communication system 51 comprises a plurality of optical character recognition (OCR)-facsimile (FAX) apparatuses 52 placed at a plurality of order terminal sides, and the OCR center apparatus 13 connected to the OCR-FAX apparatuses 52 through the communication lines 14. Each of the OCR-FAX apparatuses 52 has an OCR function for recognizing pieces of entry information written in an OCR document sheet to convert the entry information into pieces of character recognized data, a facsimile communication function for facsimile-transmitting pieces of image data read from a facsimile manuscript to the OCR center apparatus 13 and receiving the image data transmitted from the apparatus 13, and a data communication function for transmitting various types of code data including the character recognized data to the center apparatus 13 and receiving the code data transmitted to the center apparatus 13.

Figure 15:
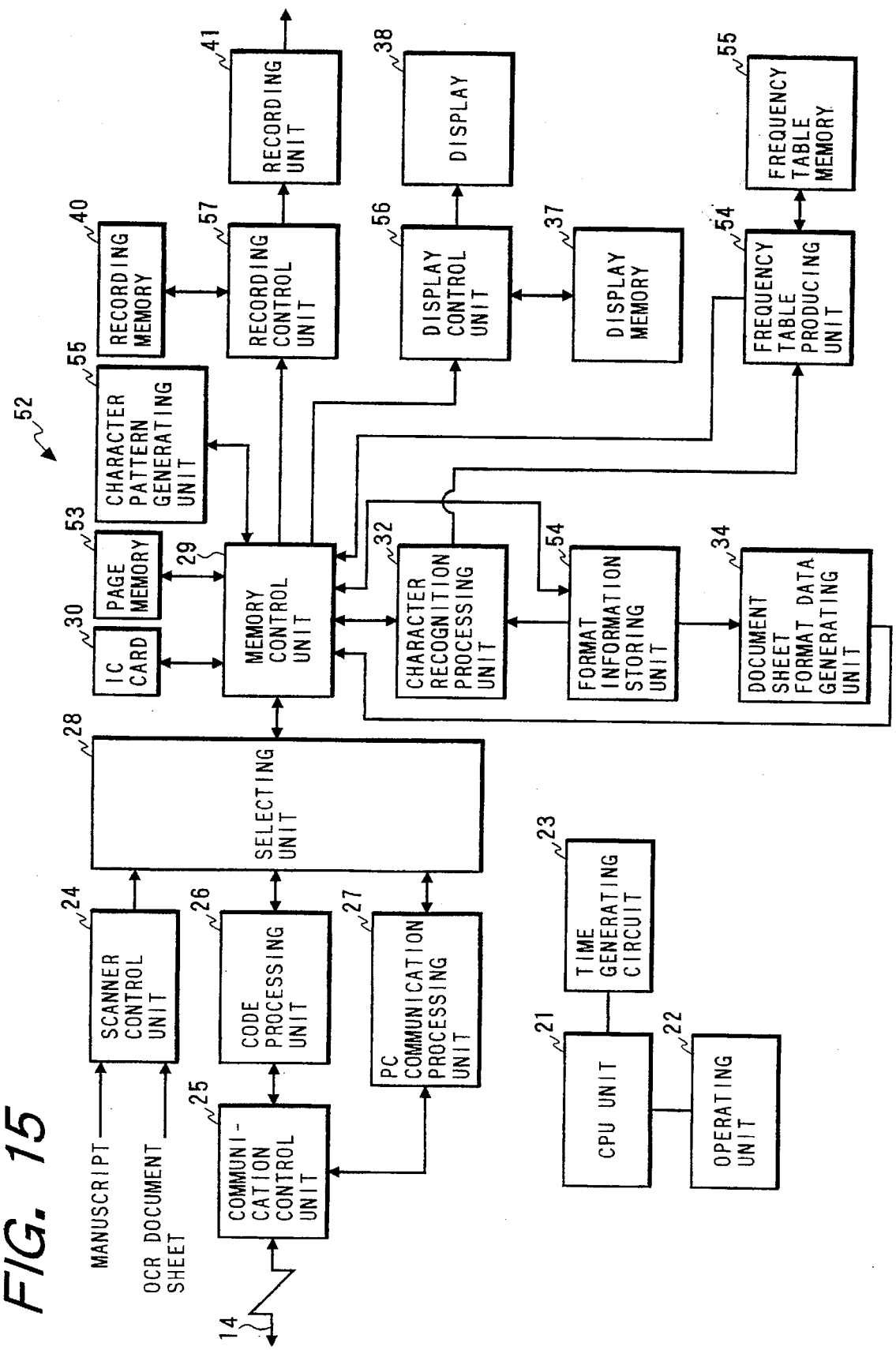
FIG. 15 is a block diagram showing the configuration of each of OCR-FAX apparatuses shown in FIG. 14.

Each of the OCR-FAX apparatuses 52 is provided with the display 38, the correcting key 18, and the function key 19. FIG. 15 is a block diagram showing the configuration of each of the OCR-FAX apparatuses 52.

As shown in FIG. 15, the facsimile apparatus 52 comprises the CPU 21, the operating unit 22, the time generating circuit 23, the scanner control unit 24, the communication control unit 25, the code processing unit 26, the PC communication processing unit 27, the selecting unit 28, the memory control unit 29, the IC card 30, a page memory 53 for storing the image data obtained in the scanner control unit 24, storing pieces of character recognized data obtained from the image data as the code data according to an optical character recognition, and a plurality of strains of fixed characters such as "ordering date", "member's code", "item code", "article code", and "delivered code" which support the realization of the character recognized data displayed or printed, the character recognition processing unit 32, the format information storing unit 33, the document sheet format data generating unit 34, the character pattern generating unit 35, the display control unit 36, the display memory 37, the display 38, the recording control unit 39, the record memory 40, the recording unit 41, a frequency table producing unit 54 for producing a frequency table in which a plurality of entry candidates for an entry article are arranged in the order of frequency in use of the entry candidates in case where one of the entry candidates is selected and written in the OCR document sheet as an entry article, and a frequency table memory 55 for storing the frequency table produced in the frequency table producing unit 54.

An example of the use of the frequency table is described on condition that the OCR document sheet is utilized as a shipping sheet of flower.

FIG. 16 shows a part of the OCR document sheet utilized as a shipping sheet of flower.

As shown in FIG. 16, a plurality of strains of fixed characters such as "ordering date", "member's code", "item code", "article code", and "delivered code" are printed in the OCR document sheet in advance. In addition, a plurality of entry candidates for an entry article are printed in the OCR document sheet in advance. In this embodiment, because the OCR document sheet is utilized as a shipping sheet of flower, flower names "tulip", "chrysanthemum", "sweet pea", "lily" and "dahlia" and numerals of two figures are printed in pairs. A group of the flower names and the numerals printed is called a piece of entry advice information in this embodiment.

Therefore, an operator writes pieces of code data in squared entry positions of the OCR document sheet as the ordering date, the member's code, the item code, the article code, and the delivered date. In detail, when the operator desires to order a chrysanthemum while referring the entry advice information, the operator writes a piece of code data "02" printed with the strain of fixed characters "chrysanthemum" in pair as the article code. Thereafter, when contents of an order written in the OCR document sheet is read by the scanner control unit 24 and the article code written in the OCR document sheet is recognized in the character recognition processing unit 32, the frequency in use of the article code is calculated for each of the flower names in the frequency table producing unit 54.

FIG. 17A shows a frequency table produced in the frequency table producing unit 54, and FIG. 17B shows a code conversion table between a group of the flower names and a group of the article codes.

In FIG. 17A, the article codes indicating the flower names are arranged in the order of frequency in use of the article codes. The frequency table is renewed each time contents of an order written in the OCR document sheet are recognized and is stored in the frequency table memory 55. The entry advice information composed of the numerals of two figures and the flower names corresponding to the numerals is stored in the format information storing unit 33 in advance. When the entry advice information is output to the document sheet format data generating unit 34 to renew the OCR document sheet, the frequency table stored in the frequency table memory 55 is referred by the memory control unit 29, and the numerals and the flower names registered in a code conversion table shown in FIG. 17B are sorted according to the arranged order of the numerals in the frequency table to arrange the pairs of numerals and flower names in the order of frequency in use of the article codes (or entry candidates).

Also, in case where the OCR document sheet is printed out in the recording unit 41, the character recognized data, the strains of fixed characters, the strains of converted characters and the entry advice information in which the pairs of numerals and flower names are arranged in the order of frequency in use of the article codes are developed in a bit map (that is, arranged in an arrangement form shown in FIG. 18) in the character pattern generating unit 35, and the contents of the order written in the OCR document sheet is output in the recording unit 41. In this case, it is applicable that the entry advice information written in the OCR document sheet be output without sorting the pairs of numerals and flower names registered in the code conversion table.

Figures 18, 19:
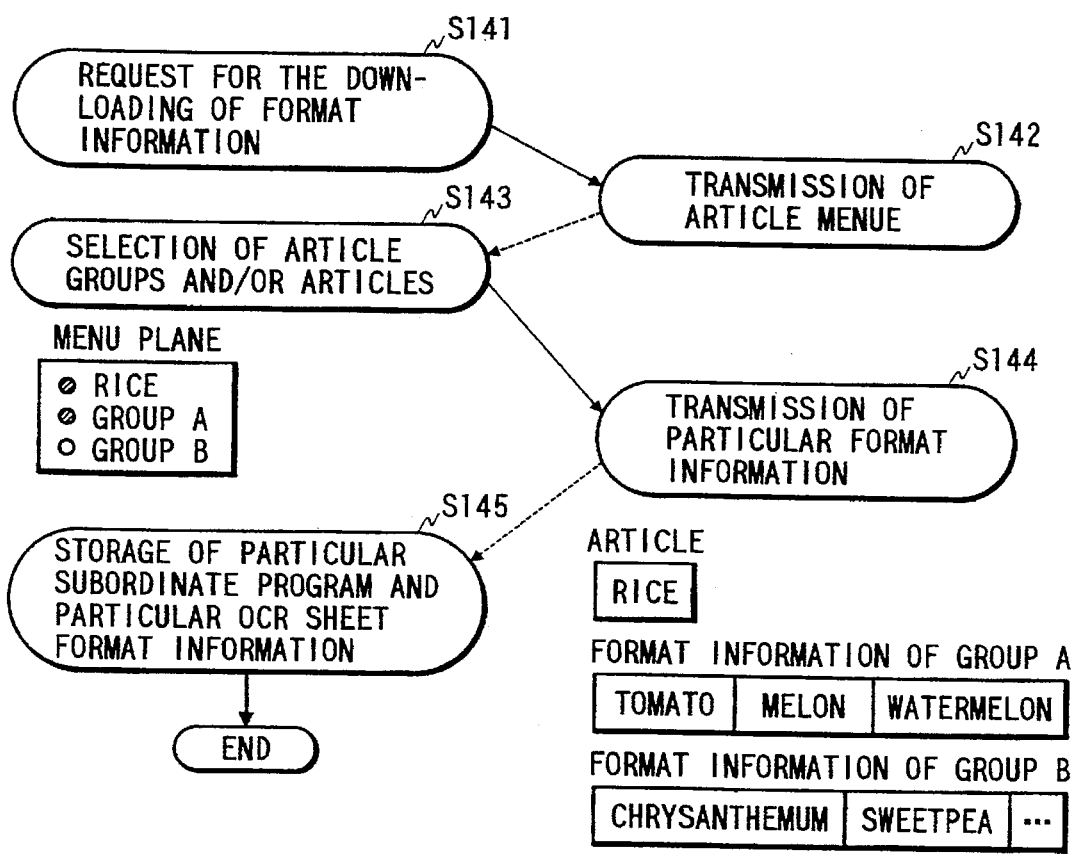
FIG. 18 shows an OCR document sheet in which pairs of numerals and flower names are sorted according to the frequency table in the order of frequency in use.
FIG. 19 shows a procedure for transmitting pieces of format information from the center apparatus to the facsimile apparatus according to a third embodiment.

FIG. 18 shows the OCR document sheet in which the pairs of numerals and flower names are sorted according to the frequency table.

In FIG. 16, the flower names "tulip", "chrysanthemum", "sweet pea", "lily" and "dahlia" are arranged in that order as the entry advice information. However, as shown in FIG. 18, because the pairs of numerals and flower names are sorted according to the frequency table, the flower names "chrysanthemum", "crocus", "tulip", "sweet pea" and "lily" are arranged in that order as the entry advice information. In this embodiment, five high-frequency flower names are limitedly written as the entry advice information. Therefore, the flower name "crocus" not shown in FIG. 16 is shown in FIG. 18, and the flower name "dahlia" not shown in FIG. 18 is shown in FIG. 16.

Accordingly, because the pairs of the numerals and the flower names are arranged in the order of frequency in use, the operator can efficiently select a flower name, and the operator can reliably write a numeral corresponding to the flower name selected.

In the above embodiment, the printing operation of the OCR document sheet in which the entry advice information is included is performed in each of the facsimile apparatus 52. However, it is applicable that a part of the printing operation be performed in the center apparatus 13. In detail, the frequency table produced in the frequency table producing unit 54 is transmitted to the center apparatus 13, the code conversion table is sorted according to the frequency table to arrange the pairs of numerals and flower names in the order of frequency in use, the entry advice information is developed in the bit map, the entry advice information developed is added to pieces of image data of the OCR document sheet, the entry advice information developed and the image data are transmitted to the facsimile apparatus 52 according to a facsimile transmission, and the entry advice information developed and the image data transmitted are printed or displayed. In this case, the frequency table is stored in a non-volatile memory of the IC card 30 such as an electrically erasable/programmable read only memory (EEPROM) or the like. Therefore, the frequency table can be renewed.

Accordingly, the entry advice information appropriate to each of the facsimile apparatuses 13 can be written in the OCR document sheet.

Next, a third embodiment is described.

In this embodiment, in case where pieces of OCR recognition information are down-loaded from the center apparatus 13 to the facsimile apparatus 52, the selection of one or more pieces of OCR recognition information is described.

Each of the OCR recognition information is composed of a subordinate program corresponding to a peculiar format of a type of OCR document sheet not common to the types of OCR document sheets and a piece of OCR sheet format information indicating the configuration of a type of OCR document sheet. The OCR recognition information is called a piece of format information. Because the format information exists for each of the types of OCR document sheets, the selection of the format information denotes the selection of the OCR document sheet. In the center apparatus 13, an article menu of the format information registered is prepared in advance, and the article menu is transmitted to the facsimile apparatus 52 when the facsimile apparatus 52 inquire the center apparatus 52 the format information, and one or more pieces of format information are selected in the facsimile apparatus 52.

FIG. 19 shows a procedure for transmitting the format information from the center apparatus 52 to the facsimile apparatus 13.

The intention of the operator that he desires to receive one or more pieces of format information from the center apparatus 13 is transmitted from the facsimile apparatus 52 to the center apparatus 13 (step S141). In the center apparatus 13, an article menu of all pieces of format information registered is transmitted to the facsimile apparatus 52 (step S142).

FIG. 20A shows a management table stored in the center apparatus 13, and FIG. 20B shows the article menu of the format information received in each of the facsimile apparatuses 52.

As shown in FIG. 20A, the format information respectively composed of a format name indicating an article name and an article group to which an article indicated by the format name belongs are arranged in a tabular form in a management table stored in the center apparatus 13. One or more articles closely relating to each other belong to one of the article groups. Therefore, when the operator selects a particular article group from among the article groups, the articles belonging to the particular article groups are selected. For example, in case where the operator selects the article group A, a tomato, a melon and a watermelon are simultaneously selected. Also, when the operator selects a particular article, only the particular article is selected.

Thereafter, as shown in FIG. 20B, the article menu received is displayed in the display 38 of the facsimile terminal 52, and one or more article groups and/or one or more articles are selected in the facsimile apparatus 52 (step S143). Thereafter, the selected article groups and/or articles are informed the center apparatus 13. In the center apparatus 13, pieces of particular format information corresponding to the selected article groups and/or articles are transmitted to the facsimile apparatus 13 (step S144). As shown in FIG. 21, a piece of selection advice information transmitted from the center apparatus 13 is displayed in the display 38. In the selection advice information, a plurality of pieces of article selection advice information for respectively selecting an article and a plurality of group selection advice information for respectively selecting an article group exist. Therefore, the operator can select one or more article groups and/or one or more articles. In this embodiment, the article group A is, for example, selected by the operator. Thereafter, a particular subordinate program of the particular format information is stored in the IC card 30, and a particular OCR sheet format information is stored in the format information storing unit 33 (step S145).

Accordingly, because the article menu of the format information to be selected in the facsimile apparatus 52 is transmitted from the center apparatus 13 to the facsimile apparatus 52, the selection of the format information can be easily and correctly performed. In other words, the selection of a type of OCR document sheet required in each of the facsimile apparatuses 52 can be easily and correctly performed.

Also, because a plurality of articles belonging to one or more article groups can be selected, the articles can be selected at a short time.

Next, a procedure of the communication between the facsimile apparatus 52 and the center apparatus 13 is described.

FIG. 22 shows a procedure of a format information communication performed according to a pulse-code (PC) modem communication.

As shown in FIG. 22, in a period A, a line connection between the OCR center apparatus 13 and a facsimile apparatus 52 is initially performed by the facsimile apparatus 52, an acknowledge (ACK) signal is sent from the center apparatus 13 to the facsimile apparatus 52, a format information transmission request for requesting the article menu of the format information is sent from the facsimile apparatus 52 to the center apparatus 13, an ACK signal is sent back, and a transmission right is sent from the facsimile apparatus 52 to the center apparatus 13.

Thereafter, in a period B, a format information transmission notice is sent from the center apparatus 13 to the facsimile apparatus 52, an ACK signal is sent back, the article menu of the format information is transmitted from the center apparatus 13 to the facsimile apparatus 52, and one or more pieces of particular format information selected by the operator in the facsimile apparatus 52 is informed the center apparatus 13.

Thereafter, in a period C, the transmission of the particular format information is prepared. That is, the transmission right is sent back to the facsimile apparatus a transmission request of the particular format information selected is sent to the center apparatus 13, an ACK signal is sent back, and the transmission right is sent back to the center apparatus 13.

Thereafter, in a period D, the particular format information selected is sent to the facsimile apparatus 52. That is, a transmission notice of the particular format information is sent to the facsimile apparatus 52 to inform the apparatus 52 of the transmission of the particular format information, an ACK signal is sent back, the particular format information composed of the particular subordinate program and the particular OCR sheet format information is down-loaded to the facsimile apparatus 52, and an ACK signal or a non-acknowledge (NACK) signal is transmitted to the center apparatus 13.

Thereafter, in a period E, the transmission right is sent back to the facsimile apparatus 52, the communication line 14 is disconnected at an order terminal side, and an ACK signal is sent back.

FIG. 23 shows a procedure of a normal facsimile communication in which pieces of image information of the OCR document sheet corresponding to the particular format information selected is transmitted from the facsimile modem 17 of the center apparatus 13 to the facsimile apparatus 52.

As shown in FIG. 23, when a line connection between the OCR center apparatus 13 and a facsimile apparatus 52 is performed by the center apparatus 13, an order terminal side identifying signal is transmitted from the facsimile apparatus 52 to the center apparatus 13 to identify the facsimile apparatus 52. Thereafter, a pre-procedure of a facsimile communication is performed, and pieces of image information (or pieces of picture data) of the OCR document sheet corresponding to the particular format information selected is transmitted from the facsimile modem 17 of the center apparatus 13 to the facsimile apparatus 52 are transmitted from the center apparatus 13 to the facsimile apparatus 52. Thereafter, an after-procedure of the facsimile communication is performed, and the line is disconnected.

Next, the request of the facsimile apparatus 52 to the center apparatus 13 for the format information, the down-loading of the format information and the reception of the image information of the OCR document sheet are described according to a fourth embodiment in which the above communication procedures are performed according to the third embodiment.

Figure 24:
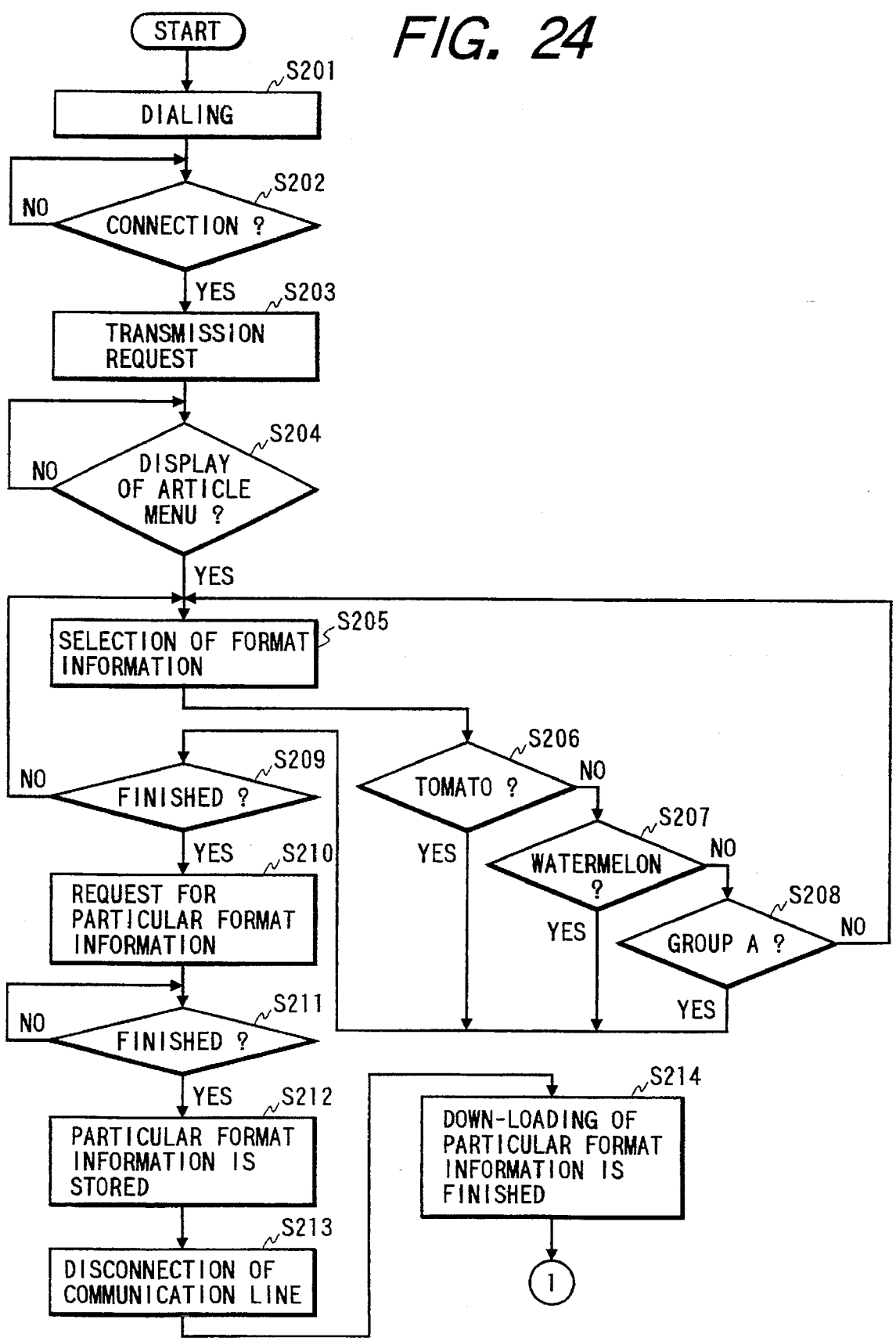
FIG. 24 is a flow chart showing the procedure from the request for the format information to the down-loading of the format information, according to a fourth embodiment.
Figure 25:
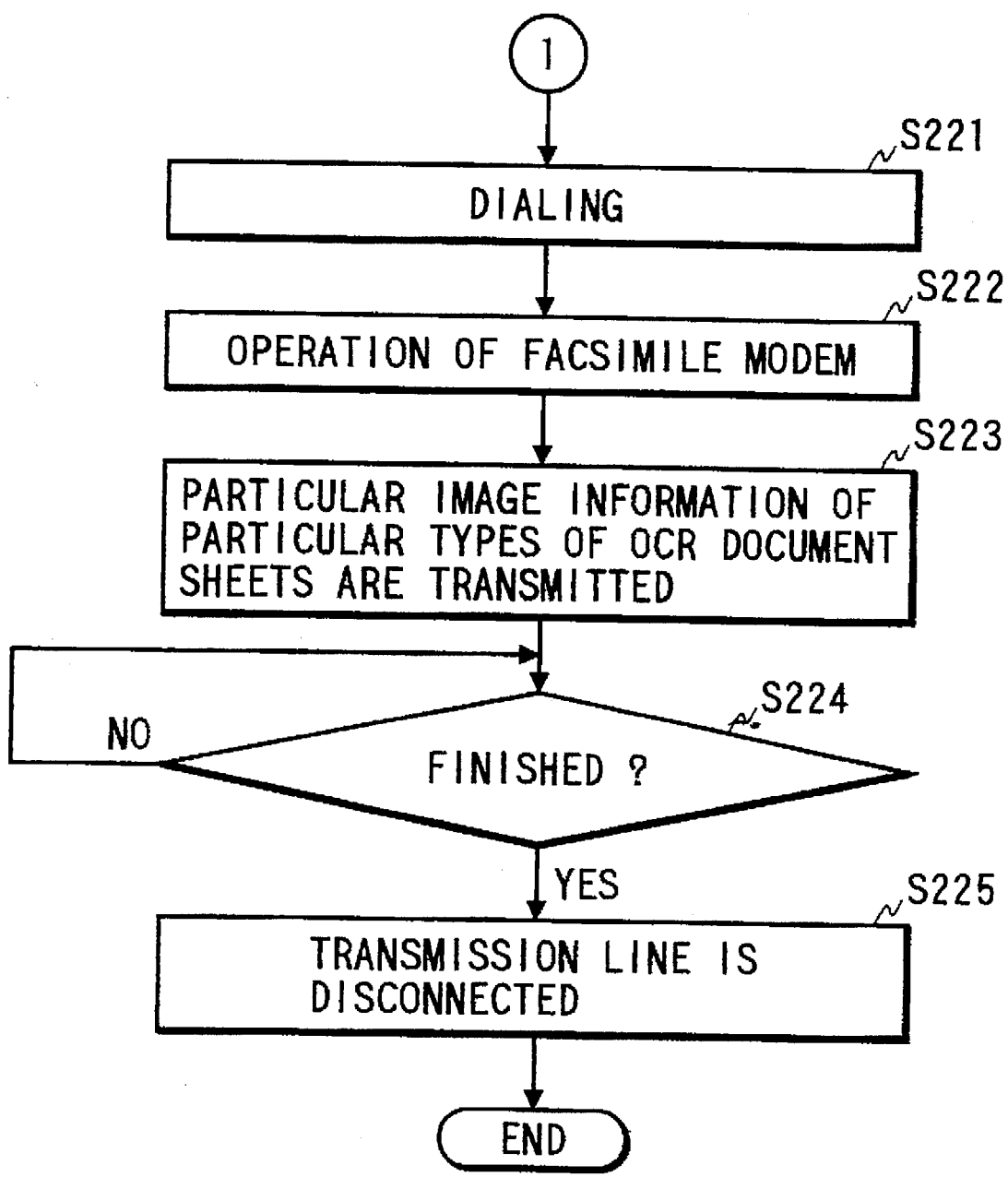
FIG. 25 is a flow chart showing the reception of the image information of the OCR document sheet.

FIG. 24 is a flow chart showing the procedure from the request for the format information to the down-loading of the format information, and FIG. 25 is a flow chart showing the reception of the image information of the OCR document sheet.

As shown in FIG. 24, an operator dials the center apparatus 13 to operate the data modem (or PC modem) of the communication control unit 25 and to call up the center apparatus 13 (step 201). When the communication line 14 is connected (step 202), a transmission request for requesting the down-loading of the format information from the center apparatus 13 is transmitted to the center apparatus 13 (step S203). Thereafter, the article menu in which the format information registered are shown in a tabular form is transmitted to the facsimile apparatus 52. When the article menu is displayed in the display 38 (step S204), one or more pieces of format information desired by the operator are selected (step 205). In detail, the operator judges whether or not an OCR document sheet corresponding to a tomato is required (step S206). Thereafter, the operator judges whether or not an OCR document sheet corresponding to a watermelon is required (step S207), and the operator judges whether or not an OCR document sheet corresponding to an article group A is required (step S208). When one of the OCR document sheets is required, the operator judges whether or not the selection of the articles and/or article groups is finished (step S209). In case where the selection is not finished, the selection of other articles and/or article groups is judged. Also, in case where any of the articles and/or groups is not selected in either the step S 206, S207 or S208, the selection of other articles and/or article groups is judged by the operator (not shown in FIG. 24). Therefore, a plurality of types of OCR document sheets can be selected. After the selection of the articled and/or article groups is finished, the selection is informed the center apparatus 13, and the operator requests the center apparatus 13 to down-load pieces of particular format information corresponding to the selected articles and/or article groups (step S210). When the reception of the particular format information is finished (step S 211), a plurality of particular subordinate programs of the particular format information are stored in the IC card 30 with a recognition basic program utilized to recognize contents of an order written in each of the particular format information, and pieces of particular OCR sheet format information of the particular format information are stored in the format information storing unit 33 (step S212). The recognition basic program is utilized for the format information in common. Thereafter, the communication between the facsimile apparatus 52 and the center apparatus 13 is disconnected (step S213), and the down-loading of the particular format information performed by using the data modem is finished (step S214).

Thereafter, as shown in FIG. 25, the center apparatus 13 dials the facsimile apparatus 52 to connect the communication line 14 between the center apparatus 13 and the facsimile apparatus 52 (step S221). When the communication line 14 is connected, the facsimile modem 17 of the center apparatus 13 is operated (step S222), pieces of particular image information of particular types of OCR document sheets corresponding to the particular format information selected are transmitted to the facsimile apparatus 52 (step S223). When the reception of the particular image information is finished (step S224), the transmission line 14 is disconnected by the facsimile apparatus 52 (step S225), and the communication is finished.

Accordingly, when the operator desires to obtain the particular types of OCR document sheets, the particular types of OCR document sheets can be printed out in the recording unit 41 according to the particular image information.

Also, because the subordinate programs of the particular format information and the recognition basic program are stored in the IC card 30, when contents of an order written in a type of particular OCR document sheet are read in the scanner control unit 24 to generate pieces of image data, the contents of the order can be recognized in the character recognition processing unit 32 according to the subordinate programs and the recognition basic program, and recognized characters can be transmitted to the center apparatus 13.

Next, a fifth embodiment is described. In the fifth embodiment, the entry advice information according to the second embodiment, a processing performed when the page memory 31 in the facsimile apparatus 52 is full up with the particular format information and a processing performed when the reception of the particular format information results in a failure are added to the fourth embodiment.

Figure 26:
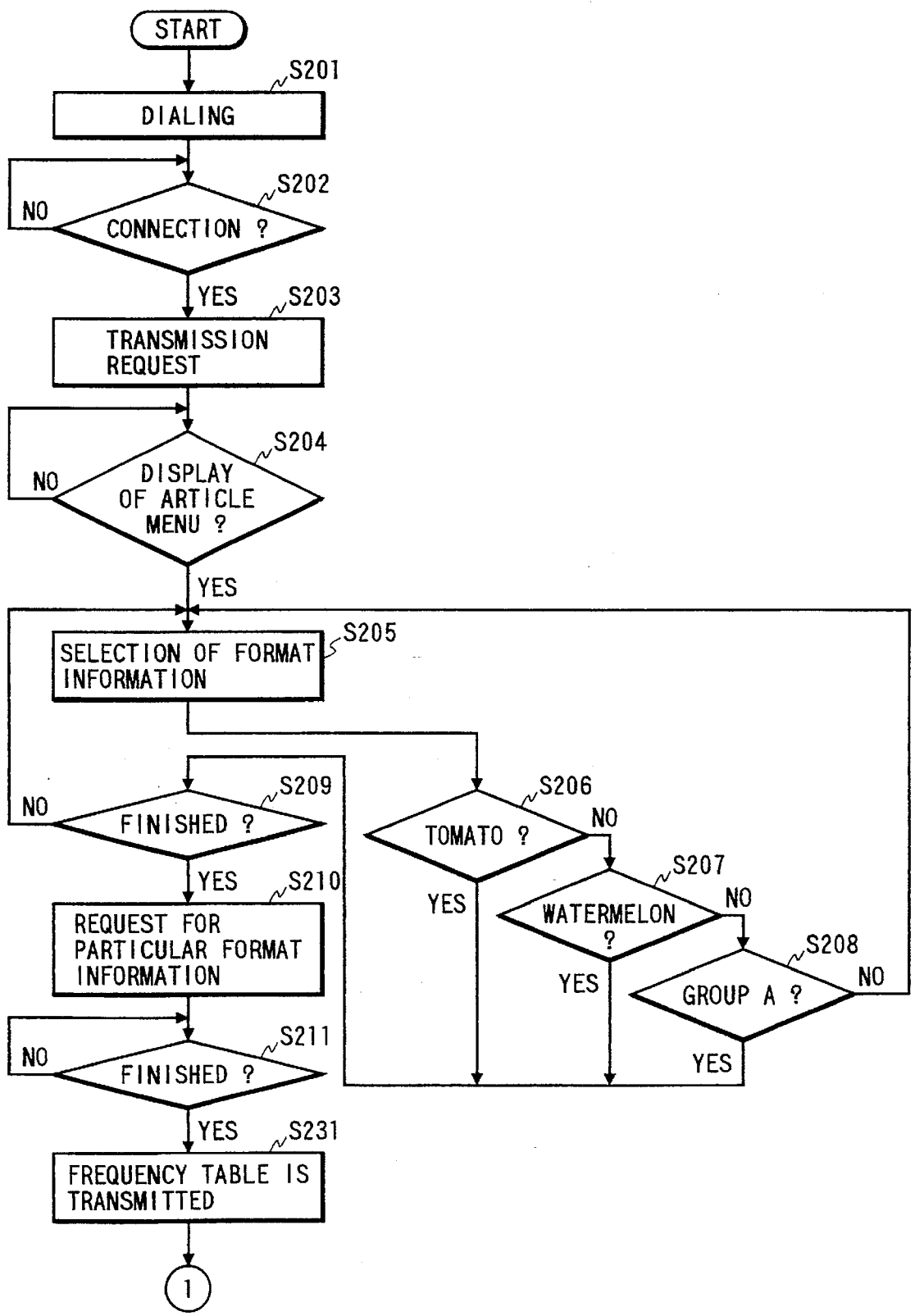
FIG. 26 is a flow chart showing a procedure required for the selection of the format information according to a fifth embodiment.
Figure 27:
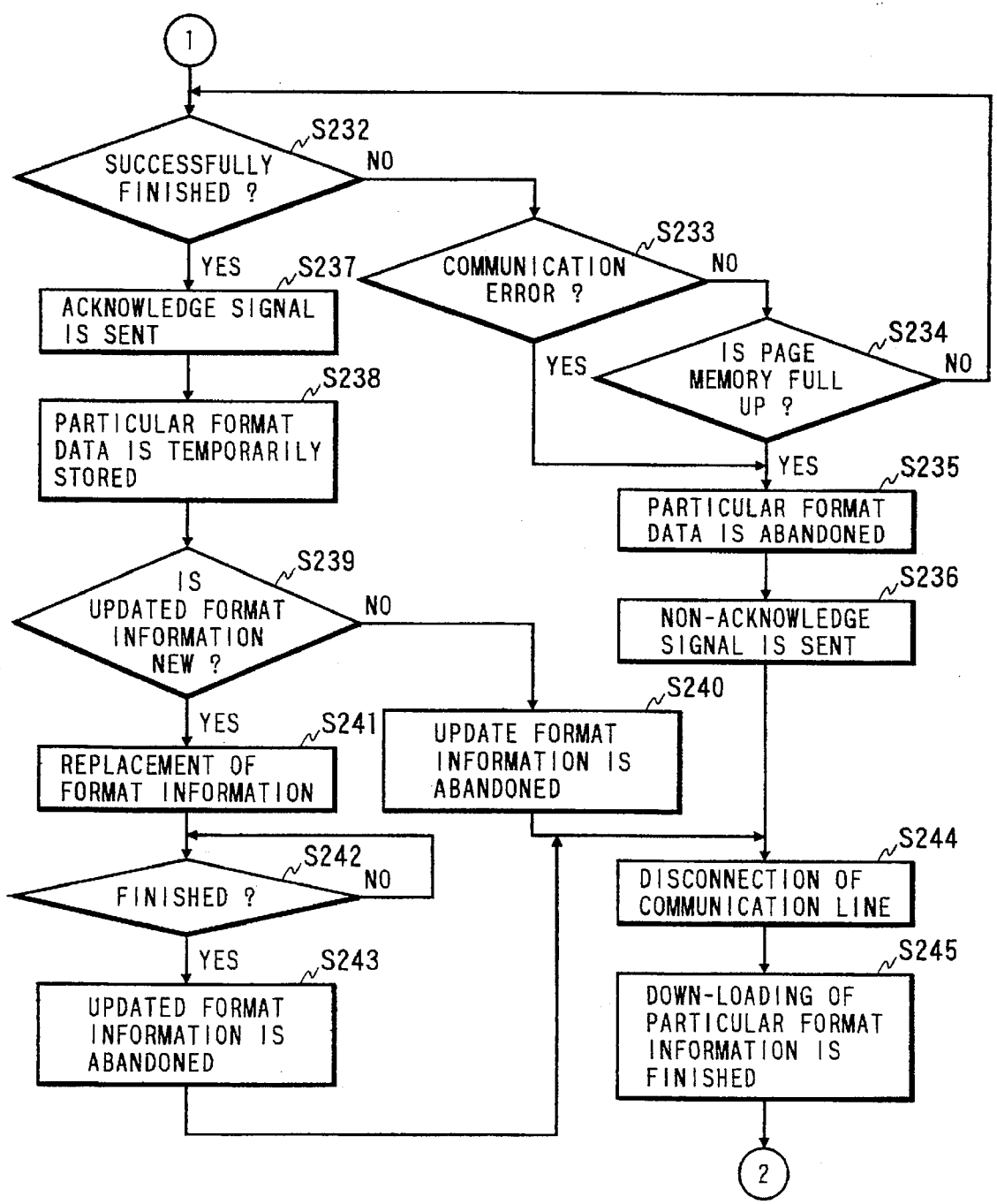
FIG. 27 is a flow chart showing a procedure required for the transmission of a frequency table produced in a frequency table producing unit shown in FIG. 15.
Figure 28:
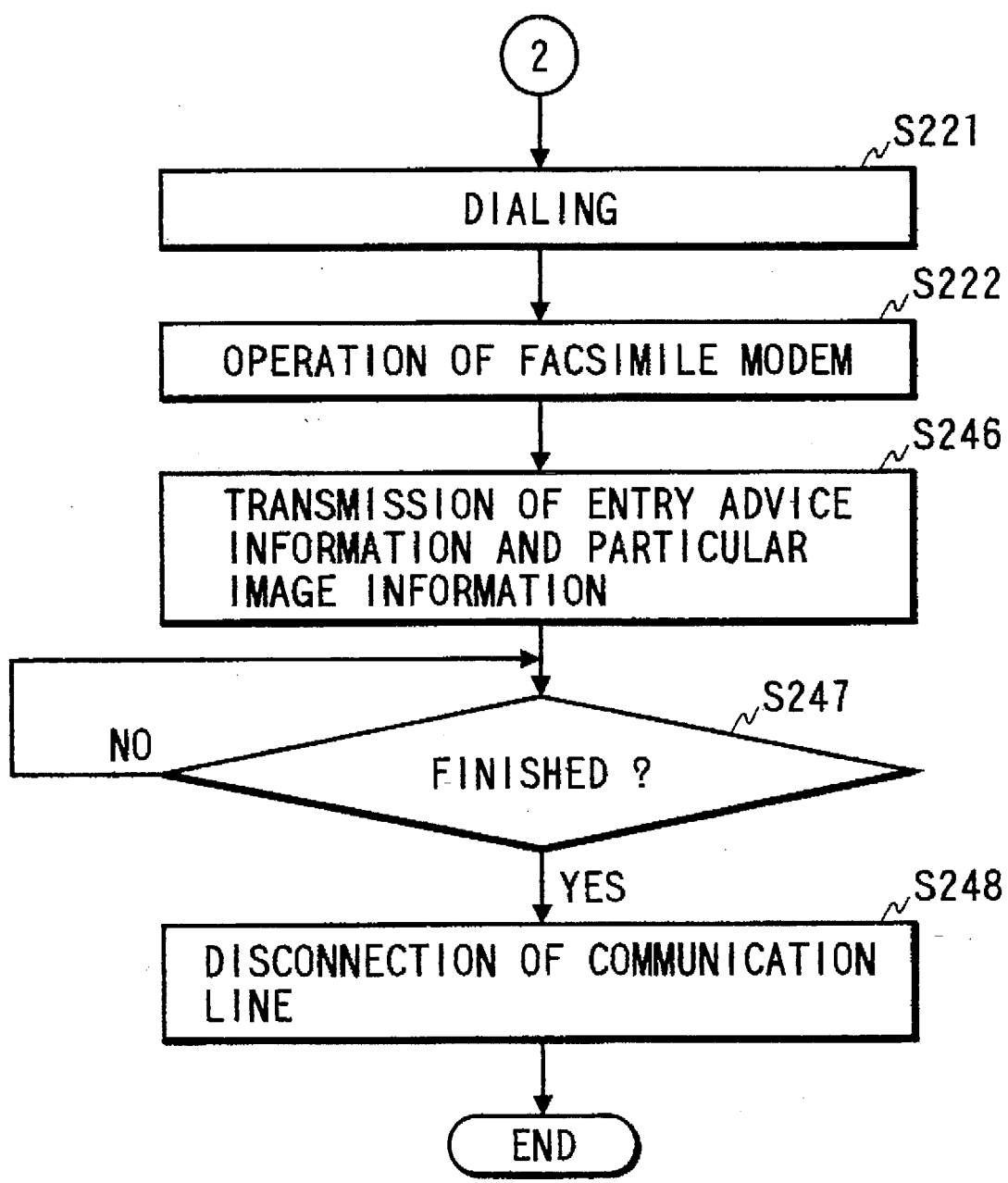
FIG. 28 is a flow chart showing a procedure required for the transmission of the image information of the OCR document sheets.

FIG. 26 is a flow chart showing a procedure required for the selection of the format information, FIG. 27 is a flow chart showing a procedure required for the transmission of the frequency table produced in the frequency table producing unit 54, and FIG. 28 is a flow chart showing a procedure required for the transmission of the image information of the OCR document sheets.

As shown in FIG. 26, the steps 201 to 211 are performed in the same manner as those shown in FIG. 24. Thereafter, the frequency table produced in the frequency table producing unit 54 is transmitted to the center apparatus 13 (step S231). In the center apparatus 13, the code conversion table shown in FIG. 17B is produced and is transmitted to the facsimile apparatus 52. In the facsimile apparatus 52, strains of converted characters indicating the entry advice information are generated in the character pattern generating unit 35 according to the code conversion table and are developed in a bit map under the control of the recording control unit 39 or the display control unit 36. Thereafter, the entry advice information and pieces of image information of an OCR document sheet overlapped with each other are printed or displayed in the recording unit 41 or the display 38, as shown in FIG. 18.

Thereafter, as shown in FIG. 27, it is judged in the CPU unit 21 whether or not the reception of the particular format information is successfully finished without any communication error (step S232). In case where it is judged that the reception of the particular format information is not successfully finished, it is judged in the CPU unit 21 whether or not an communication error is received (step S233). In case where it is judged that any communication error is not received, it is judged in the CPU unit 21 whether or not the page memory 31 is full up with the particular format information (step S234). In other words, when the page memory 31 is full up, all of the particular format information transmitted from the center apparatus 13 cannot be temporarily stored in the page memory 31. In case where the reception of a communication error is detected or the page memory 31 is full up, the particular format information is abandoned during the reception of the particular format information (step S235), and an non-acknowledge signal is sent to the center apparatus 13 to inform that the reception of the particular format information results in a failure (step S236). The reason that the particular format information is abandoned is that the particular format information including a communication error is not useful or any more pieces of particular format information cannot be received when the page memory 31 is full up. In case where the reception of the particular format information is successfully finished (step S282), an acknowledge signal is sent to the center apparatus 13 to inform that the reception of the particular format information results in success (step S287), and the particular format information received are temporarily stored in the page memory 31 (step S238) as pieces of updated format information.

Thereafter, it is judged in the memory control unit 29 whether or not the updated format information differ from the format information previously stored in the IC card 30 and the format information storing unit 33 (step S239). In case where the updated format information are the same as the format information previously stored, the updated format information are abandoned without any renewal of the format information (step S240). In contrast, in case where the updated format information differ from the format information previously stored, the format information stored in the IC card 30 and the format information storing unit 33 are replaced with the updated format information (steps S241 and S242), and the updated format information temporarily stored in the page memory 31 are abandoned (step S243).

Thereafter, the connection between the facsimile apparatus 52 and the center apparatus 13 is disconnected (step S244), and the down-loading of the particular format information performed by operating the facsimile modem 17 and the data modem of the communication control unit 25 is finished (step S245).

Thereafter, as shown in FIG. 28, the transmission of the image information of the OCR document sheets is performed. In detail, the steps S221 and S222 are performed in the same manner as the procedure in FIG. 25. Thereafter, the entry advice information produced in the center apparatus 13 according to the frequency table and pieces of particular image information of particular types of OCR document sheets corresponding to the particular format information selected are transmitted to the facsimile apparatus 52 (step S246). When the reception of the image information is finished (step S247), the transmission line 14 is disconnected by the facsimile apparatus 52 (step S248), and the communication is finished.

Accordingly, when the operator desires to obtain a particular type of OCR document sheet, the particular type of OCR document sheet in which the entry advice information and the particular image information are included can be printed out in the recording unit 41.

Also, because the subordinate programs of the particular format information and the recognition basic program are stored in the IC card 30, when contents of an order written in a type of particular OCR document sheet are read in the scanner control unit 24 to generate pieces of image data, the contents of the order can be recognized in the character recognition processing unit 32 according to the subordinate programs and the recognition basic program, and recognized characters can be transmitted to the center apparatus 13.

Next, a sixth embodiment is described. In the sixth embodiment, the format information are received from the center apparatus 13, and the image information of the types of OCR document sheets are produced in the facsimile apparatus 52 and are printed out. Therefore, the operation of the down-loading performed by receiving the format information through the data modem of the communication control unit 25 is the same as that in the forth embodiment shown in FIG. 24 and that in the fifth embodiment shown in FIGS. 26 and 27. In the sixth embodiment, the operation performed after the procedure shown in FIGS. 26 and 27 is described. In this case, the step S231 shown in FIG. 26 is not required. Because the image information of the OCR document sheet are produced in the facsimile apparatus 52, it is not required to transmit the frequency table to the center apparatus 13.

Figure 29:
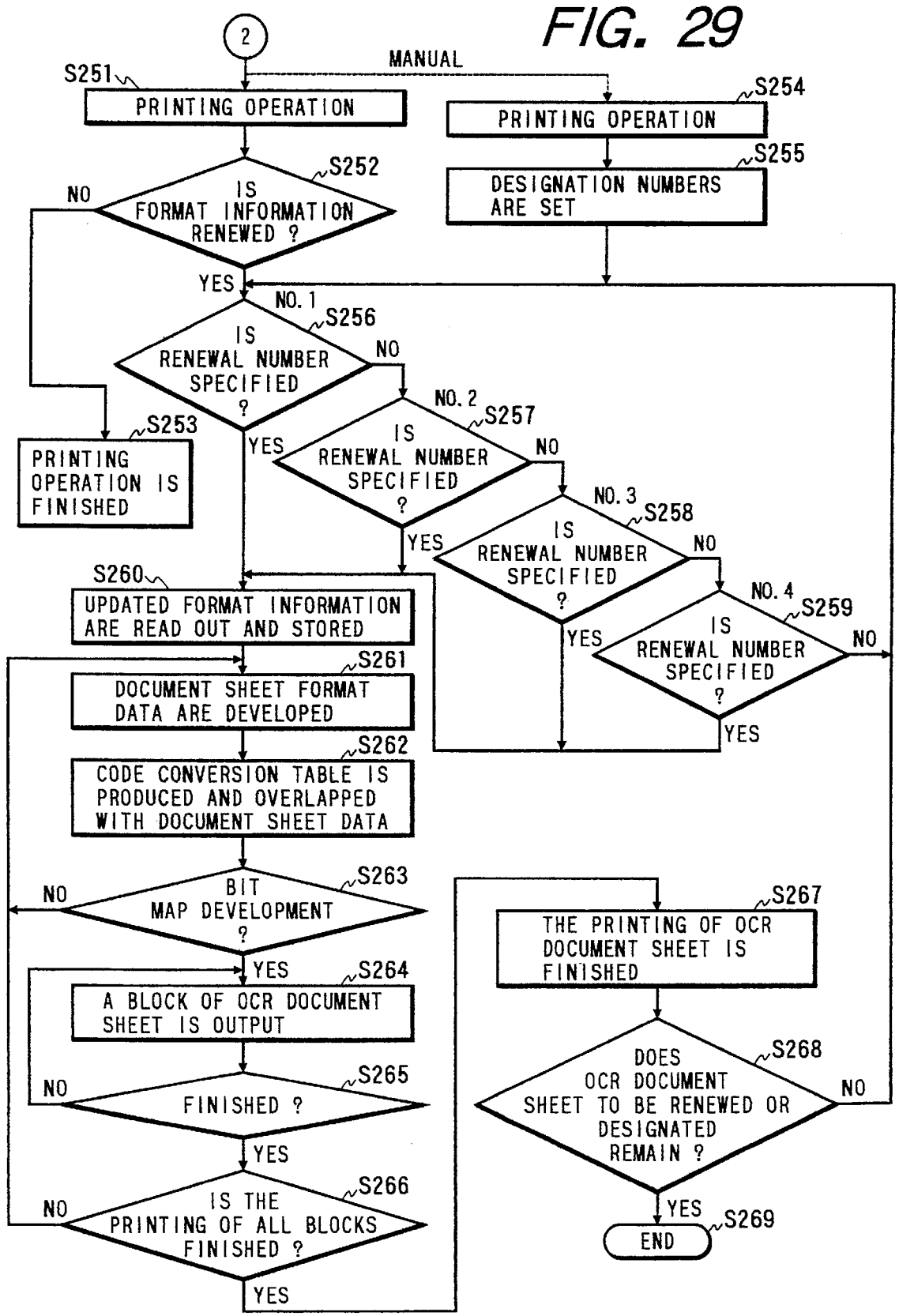
FIG. 29 is a flow chart showing the operation for producing a type of OCR document sheet according to a sixth embodiment.

FIG. 29 is a flow chart showing the operation for producing a type of OCR document sheet according to the sixth embodiment.

In each of the format information, a piece of OCR sheet format information is included and is stored in the format information storing unit 33. Thereafter, pieces of OCR document sheet format data are generated in the document sheet format data generating unit 34 according to the OCR sheet format information, and a type of OCR document sheet is printed out in the recording unit 41 according to the OCR document sheet format data. The printing operation of the OCR document sheet in which any order is not written is performed in two cases. In one of the cases, when the format information is received, the OCR document sheet is automatically printed out. In the other case, the operator arbitrarily performs the printing operation. For example, when all of the OCR document sheets stocked are consumed, a new OCR document sheet is required.

As shown in FIG. 29, after the reception of one or more pieces of types of updated format information, a printing operation of one or more OCR document sheets is automatically started (step S251). Thereafter, it is judged in the memory control unit 29 whether or not the updated format information differ from one or more pieces of format information previously received (step S252). In case where the updated format information are the same as the format information previously received, the printing operation is finished (step S253). Also, in case where the operator desires to print out one or more types of OCR document sheets in which any order is not written, a printing operation of the OCR document sheets is manually started by the operator (step S254), and one or more designation numbers of the OCR document sheets desired are set (step S255).

Thereafter, in case where at least one of the updated format information differ from the format information previously received, the renewal of the format information is required. Therefore, one or more renewal numbers designating types of the format information to be renewed are specified by the operator (steps S256, S257, S258 and S259). Thereafter, the updated format information designated by the designating numbers or specified by the renewal numbers are read out from the format information storing unit 33 to the document sheet format data generating unit 34 (step S260).

Thereafter, each of the OCR document sheet is partitioned into a plurality of blocks, and a generating operation of the document sheet format data is performed for each of the blocks. The document sheet format data are developed in a bit map, and pieces of image data are produced (step S261). Thereafter, to produce the entry advice information described in the second embodiment, the code conversion table shown in FIG. 17B is produced from the frequency table shown in FIG. 17A and is developed in a bit map, and the code conversion table is overlapped with the document sheet format data for a block (step S262). When the bit map development of the entry advice information and the document sheet format data in the recording memory 40 under the control of the recording control unit 39 is finished for the block (step S263), a block of OCR document sheet is printed out in the recording unit 41 (step S264). When the printing of the block of OCR document sheet is finished (step S265), the printing of the OCR document sheet is performed in the same manner for each of the blocks. When the printing of all of the blocks is finished (step S266), the printing of the OCR document sheet is finished (step S267). Thereafter, it is judged by the CPU unit 21 whether or not one or more types of OCR document sheets to be renewed or designated remain (step S268). In case where a type of OCR document sheet to be renewed or designated remains, a printing operation of the OCR document sheet is repeated. In case where all of the types of OCR document sheets to be renewed or designated are printed out, the printing operation is finished (step S269).

Accordingly, one or more types of OCR document sheets to be renewed or designated can be printed out according to the format information.

As is described above in the second to sixth embodiments, there are many effects in the present invention as follows.

(1) Because one or more pieces of OCR recognition information (that is, pieces of format information) utilized to recognize one or more types of OCR document sheets and one or more pieces of image information of the OCR document sheets corresponding to the OCR recognition information are transmitted from the center apparatus 13 to the facsimile apparatus 52, the OCR document sheets in which any order is not written can be printed out in the facsimile apparatus according to the image information of the OCR document sheets and one or more pieces of OCR sheet format information of the OCR recognition information. Also, contents of an order written in a type of OCR document sheet which is printed out in the facsimile apparatus can be recognized in the facsimile apparatus according to a subordinate program and a recognition basic program of the OCR recognition information corresponding to the type of OCR document sheet. Accordingly, the operator can have one or more updated types of OCR document sheets in an order terminal side.

(2) Because the frequency table produced in the frequency table producing unit 54 is transmitted to the center apparatus 13, the entry advice information is prepared according to the frequency table in the center apparatus 13 and the entry advice information is transmitted to the facsimile apparatus 52 in addition to the image information of the OCR document sheets corresponding to the OCR recognition information, the operator can easily write contents of an order in the OCR document sheet, and the operator can accurately write the contents of the order.

(3) Because the particular OCR recognition information selected in each of the facsimile apparatuses 52 are transmitted from the center apparatus 13 to each of the facsimile apparatuses 52, the particular OCR recognition information appropriate to each of the facsimile apparatuses 52 and the image information of the OCR document sheets corresponding to the particular OCR recognition information can be transmitted from the center apparatus 13 to each of the facsimile apparatuses 52.

(4) Because the OCR recognition information currently received in the facsimile apparatus 52 are abandoned and the transmission of the OCR recognition information is stopped in case where the page memory 31 is full up with the OCR recognition information or a communication error occurs during the reception of the OCR recognition information, the transmission of the image information of the OCR document sheets corresponding to the OCR recognition information is also stopped. Therefore, any useless transmission can be prevented.

(5) Because the article menu of the OCR recognition information is transmitted from the center apparatus 13 to the facsimile apparatus 52 before the particular OCR recognition information selected by the operator is transmitted from the center apparatus 13 to the facsimile apparatus 52, the operator can appropriately select the particular OCR recognition information from the OCR recognition information in the article menu shown in the display 38.

(6) Because the operator can select a plurality of articles one by one and/or select a group of articles, the articles can be easily selected.

(7) Because the image information of the OCR document sheets corresponding to the OCR recognition information are transmitted to the facsimile apparatus 52 after the OCR recognition information are successfully transmitted to the facsimile apparatus 52 without any communication error, the useless transmission of the image data can be prevented even though the OCR recognition information are not successfully transmitted to the facsimile apparatus 52.

(8) In case where the image information of the OCR document sheets corresponding to the OCR recognition information are produced in the facsimile apparatus 52, only the OCR recognition information are required as the information transmitted from the center apparatus 13 to print out types of OCR document sheets in which any order is not written. Therefore, a communication cost can be reduced.

(9) Also, because a piece of entry advice information appropriate to each type of OCR document sheets is produced in the facsimile apparatus 52, the entry advice information can be printed in each type of OCR document sheets. Therefore, the operator can easily write an order without any mistake.

(10) Also, a plurality of articles registered in the entry advice information are written in the order of frequency in use, the operator can easily and rapidly write an order without any mistake.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A facsimile apparatus for communicating with a center apparatus, comprising:
    a read only memory for storing an OCR sheet recognizing program utilized to recognize contents written in an OCR document sheet as one or more characters;
    information receiving means for receiving a piece of OCR sheet specifying information transmitted from the center apparatus, the OCR sheet specifying information being utilized to specify a format of the OCR document sheet;
    a static random access memory for temporarily storing the OCR sheet specifying information received by the information receiving means;

a nonvolatile memory for storing the OCR sheet specifying information stored in the static random access memory;

memory control means for transferring the OCR sheet specifying information from the static random access memory to the nonvolatile memory in cases where the OCR sheet specifying information is successfully transmitted from the center apparatus to the information receiving means and is stored in the static random access memory;

reading means for reading the contents written in the OCR document sheet; and character recognizing means for recognizing the contents read by the reading means as one or more characters according to the OCR sheet specifying information stored in the nonvolatile memory and the OCR sheet recognizing program stored in the read only memory.

2. A facsimile apparatus according to claim 1, further comprising:

character pattern generating means for generating a strain of characters according to a code conversion table temporarily stored in the static random access memory, the strain of characters expressing the meaning of the contents recognized as the characters by the character recognizing means; and displaying means for displaying the contents recognized as the characters by the character recognizing means and the strain of characters.

3. A facsimile apparatus for communicating with a center apparatus, comprising:

a read only memory for storing an OCR sheet recognizing program utilized to recognize contents written in an OCR document sheet as one or more characters;

information receiving means for receiving a piece of OCR sheet specifying information transmitted from the center apparatus, the OCR sheet specifying information being utilized to specifying a format of the OCR document sheet;

a static random access memory for temporarily storing the OCR sheet specifying information received by the information receiving means;

a nonvolatile memory for storing the OCR sheet specifying information stored in the static random access memory;

memory control means for transferring the OCR sheet specifying information from the static random access memory to the nonvolatile memory;

reading means for reading the contents written in the OCR document sheet;

character recognizing means for recognizing the contents read by the reading means as one or more characters according to the OCR sheet specifying information stored in the nonvolatile memory and the OCR sheet recognizing program stored in the read only memory; and displaying means for displaying a piece of guide information transmitted from the center apparatus to select a group of format information composed of the OCR sheet recognizing program and the OCR sheet specifying information corresponding to the OCR document sheet from among various groups of format information corresponding to various types of OCR document sheets, the OCR sheet specifying information of the group of format information selected being transmitted to the static random access memory.

4. A facsimile apparatus for communicating with a center apparatus, comprising:

a read only memory for storing an OCR sheet recognizing program utilized to recognize contents written in each of types of OCR document sheets as one or more characters;

information receiving means for receiving a piece of OCR sheet specifying information and one or more pieces of format information transmitted from the center apparatus, the OCR sheet specifying information being utilized to specify a plurality of formats of the types of OCR documents sheets, and the format information relating to the types of OCR document sheets in one-to-one correspondence;

a static random access memory for temporarily storing the OCR sheet specifying information and the format information received by the information receiving means;

a nonvolatile memory for storing the OCR sheet specifying information and the format information stored in the static random access memory;

memory control means for transferring the OCR sheet specifying information and the format information from the static random access memory to the nonvolatile memory in cases where the OCR sheet specifying information and the format information successfully transmitted from the center apparatus to the information receiving means and are stored in the static random access memory;

reading means for reading the contents written in a type of particular OCR document sheet; and character recognizing the contents read by the reading means as one or more characters according to the OCR sheet specifying information stored in the nonvolatile memory and the OCR sheet recognizing program stored in the read only memory.

5. A facsimile apparatus according to claim 4, further comprising:

character pattern generating means for generating a strain of characters according to a code conversion table included in the format information, the strain of characters expressing the meaning of the contents recognized as the characters by the character recognizing means; and displaying means for displaying the contents recognized as the characters by the character recognizing means and the strain of characters.

6. A facsimile apparatus for communicating with a center apparatus, comprising:

a read only memory for storing an OCR sheet recognizing program utilized to recognize contents written in each of types of OCR document sheets as one more characters;

information receiving means for receiving a piece of OCR sheet specifying information and one or more pieces of format information transmitted from the center apparatus, the OCR sheet specifying information being utilized to specify a plurality of formats of the types of OCR document sheets, and the format information relating to the types of OCR document sheets in one-to-one correspondence;

a static random access memory for temporarily storing the OCR sheet specifying information and the format information received by the information receiving means;

a nonvolatile memory for storing the OCR sheet specifying information and the format information stored in the static random access memory;

memory control means for transferring the OCR sheet specifying information and the format information from the static random access memory to the nonvolatile memory;

reading means for reading the contents written in a type of particular OCR document sheet;

character recognizing means for recognizing the contents read by the reading means as one or more characters according to the OCR sheet specifying information stored in the nonvolatile memory and the OCR sheet recognizing program stored in the read only memory; and displaying means for displaying a piece of guide information transmitted from the center apparatus to select a group of information composed of the OCR sheet recognizing program, the OCR sheet specifying information and the format information corresponding to the particular OCR document sheet from among a plurality of groups of information corresponding to the types of OCR document sheets, the OCR sheet specifying information and the format information of the group of information selected being transmitted to the static random access memory.

7. A communication system, comprising:

an OCR center apparatus for modifying a piece of OCR sheet specifying information, the OCR sheet specifying information being utilized to specify a format of a OCR document sheet;

a plurality of facsimile apparatuses for respectively communicating with the OCR center apparatus; and a plurality of communicating lines for respectively connecting the OCR center apparatus and one of the facsimile apparatuses, each of the facsimile apparatuses comprising a read only memory for storing an OCR sheet recognizing program utilized to recognize contents written in the OCR document sheet as one or more characters, information receiving means for receiving the OCR sheet specifying information transmitted from the center apparatus, a static random access memory for temporarily storing the OCR sheet specifying information received by the information receiving means, a nonvolatile memory for storing the OCR sheet specifying information stored in the static random access memory, and memory control means for transferring the OCR sheet specifying information from the static random access memory to the nonvolatile memory in cases where the OCR sheet specifying information is successfully transmitted from the center apparatus to the information receiving means and is stored in the static random access memory.

8. A communication system, comprising:

an OCR center apparatus for modifying a piece of OCR sheet specifying information, the OCR sheet specifying information being utilized to specify a format of an OCR document sheet;

a plurality of communication lines for respectively connecting the OCR center apparatus and one of the facsimile apparatuses, each of the facsimile apparatuses comprising a read only memory for storing an OCR sheet recognizing program utilized to recognize contents written in the OCR document sheet as one or more characters, information receiving means for receiving the OCR sheet specifying information transmitted from the center apparatus, a static random access memory for temporarily storing the OCR sheet specifying information received by the information receiving means, a nonvolatile memory for storing the OCR sheet specifying information stored in the static random access memory;

memory control means for transferring the OCR sheet specifying information from the static random access memory to the nonvolatile memory, and displaying means for displaying a piece of guide information transmitted from the center apparatus to select a group of format information composed of the OCR sheet recognizing program and the OCR sheet specifying information corresponding to the OCR document sheet from among various groups of format information corresponding to various types of OCR document sheets, the OCR sheet specifying information of the group of format information selected being transmitted to the static random access memory.

9. A communication system, comprising:

an OCR center apparatus for modifying a piece of OCR sheet specifying information and one or more pieces of format information, the OCR sheet specifying information being utilized to specify a plurality of formats of types of OCR document sheets, and the format information relating to the types of OCR document sheets in one-to-one correspondence;

a plurality of facsimile apparatuses for respectively communicating with the OCR center apparatus; and a plurality of communicating lines for respectively connecting the OCR center apparatus and one of the facsimile apparatuses, each of the facsimile apparatuses comprising a read only memory for storing an OCR sheet recognizing program utilized to recognize contents written in each of types of OCR documents sheets as one or more characters, information receiving means for receiving the OCR sheet specifying information and the format information transmitted from the center apparatus;

a static random access memory for temporarily storing the OCR sheet specifying information and the format information received by the information receiving means;

a nonvolatile memory for storing the OCR sheet specifying information and the format information stored in the static random access memory;

memory control means for transferring the OCR sheet specifying information and the format information from the static random access memory to the nonvolatile memory; and displaying means for displaying a piece of guide information transmitted from the center apparatus to select a group of format information composed of the OCR sheet recognizing program, the OCR sheet specifying information and the format information corresponding to the particular OCR document sheet from among a plurality of groups of information corresponding to the types of OCR document sheets, the OCR sheet specifying information and the format information of the group of information selected being transmitted to the static random access memory.

10. A communication system, comprising:

an OCR center apparatus for transmitting a piece of image information and a piece of OCR recognition information respectively corresponding to a type of OCR document sheet;

a plurality of facsimile apparatuses for respectively receiving the image information and the OCR recognition information transmitted from the OCR center apparatus;

a plurality of communication lines for respectively connecting the OCR center apparatus and one of the facsimile apparatuses to transmit the image information and the OCR recognition information from the OCR center apparatus to one of the facsimile apparatuses, each of the facsimile apparatuses comprising
- a first memory for storing the image information,
- a printer for printing out the type of OCR document sheet according to the image information stored in the first memory, an order being written in the type of OCR document sheet by an operator,
- a second memory for storing the OCR recognition information, and
- a character recognizing unit for recognizing the order which are written in the type of OCR document sheet printed out in the printer according to the OCR recognition information stored in the second memory.

11. A communication system comprising:

an OCR center apparatus for transmitting a piece of image information, a piece of entry advice information and a piece of OCR recognition information respectively corresponding to a type of OCR document sheet;

a plurality of facsimile apparatuses for respectively receiving the image information, the entry advice information and the OCR recognition information transmitted from the OCR center apparatus;

a plurality of communication lines for respectively connecting the OCR center apparatus and one of the facsimile apparatuses to transmit the image information, the entry advice information and the OCR recognition information from the OCR center apparatus to one of the facsimile apparatuses, each of the facsimile apparatuses comprising

- a first memory for storing the image information and the entry advice information,
- a printer for printing out the type of OCR document sheet according to the image information and the entry advice information stored in the first memory, an order being written in the type of OCR document sheet by an operator while referring the entry advice information,
- a second memory for storing the OCR recognition information, and
- a character recognizing unit for recognizing the order which are written in the type of OCR document sheet printed out in the printer according to the OCR recognition information stored in the second memory.

12. A communication system according to claim 11 in which each of the facsimile apparatuses further comprising:
- a frequency table producing unit for producing a frequency table in which a plurality of articles are registered in the order of frequency in use, the frequency table being transmitted to the center apparatus to arrange a plurality of articles registered in the entry advice information in the order of frequency in use, and the entry advice information in which the articles are arranged in the order of frequency in use being printed in the type of OCR document sheet in the printer.

13. A communication system, comprising:

an OCR center apparatus for transmitting a recognition information menu of pieces of OCR recognition information corresponding to a plurality of types of OCR document sheet;

a plurality of facsimile apparatuses for respectively selecting a piece of particular OCR recognition information corresponding to a particular type of OCR document sheet from the recognition information menu transmitted from the OCR center apparatus and respectively receiving the particular OCR recognition information and a piece of image information corresponding to the particular type of OCR document sheet from the OCR center apparatus;

a plurality of communication lines for respectively connecting the OCR center apparatus and one of the facsimile apparatuses to transmit the recognition information menu, the particular OCR recognition information and the image information from the OCR center apparatus to one of the facsimile apparatuses, each of the facsimile apparatuses comprising
- a first memory for storing the image information,
- a printer for printing out the particular type of OCR document sheet according to the image information stored in the first memory, an order being written in the particular type of OCR document sheet by an operator,
- a second memory for storing the particular OCR recognition information, and
- a character recognizing unit for recognizing the order which are written in the particular type of OCR document sheet printed out in the printer according to the particular OCR recognition information stored in the second memory.

14. A communication system according to claim 13 in which each of the facsimile apparatuses further comprising:
- a format information storing unit for storing a piece of entry advice information in which a plurality of articles are arranged;
- a frequency table producing unit for producing a frequency table in which the articles are registered in the order of frequency in use; and
- a memory control unit for rearranging the articles of the entry advice information stored in the format information storing unit in the order of frequency in use according to the frequency table produced in the frequency table producing unit, the entry advice information being printed to the particular type of OCR document sheet in the printer.

15. A communication system according to claim 13 in which the particular OCR recognition information is abandoned in the middle of the storage of the particular OCR recognition information in case where a remaining storage capacity of the second memory is short to store all of the particular OCR recognition information or a communication error occurs, and the transmission of the image information to each of the facsimile apparatuses is stopped.

16. A communication system according to claim 13 in which each of the facsimile apparatuses further comprises:
- a display for displaying a piece of selection advice information transmitted from the center apparatus to select the particular OCR recognition information.

17. A communication system according to claim 16 in which the selection advice information is composed of a plurality of pieces of article selection advice information utilized to respectively select an article and a plurality of group selection advice information utilized to respectively select a plurality of articles registered in an article group.

18. A communication system, comprising:
   an OCR center apparatus for transmitting a piece of OCR recognition information corresponding to a type of OCR document sheet;
   a plurality of facsimile apparatuses for respectively receiving the OCR recognition information transmitted from the OCR center apparatus;
   a plurality of communicating lines for respectively connecting the OCR center apparatus and one of the facsimile apparatuses to transmit the OCR recognition information from the OCR center apparatus to one of the facsimile apparatuses, each of the facsimile apparatuses comprising
   a memory for storing the OCR recognition information,
   a printer for printing out the type of OCR document sheet according to the OCR recognition information stored in the memory, an order being written in the type of OCR document sheet by an operator;
   a character recognizing unit for recognizing the order which are written in the type of OCR document sheet printed out in the printer according to the OCR recognition information stored in the memory;
   a format information storing unit for storing a piece of entry advice information in which a plurality of articles are arranged;
   a frequency table producing unit for producing a frequency table in which the articles are registered in the order of frequency in used; and
   a memory control unit for rearranging the articles of the entry advice information stored in the format information storing unit in the order of frequency in use according to the frequency table produced in the frequency table producing unit, the entry advice information being printed to the type of OCR document sheet in the printer.

19. A facsimile apparatus for communicating with a center apparatus, comprising:
   first storing means for storing an OCR sheet recognizing program utilized to recognize contents written in each of a plurality of typed of OCR document sheets as one or more characters;
   information receiving means for receiving a piece of OCR sheet specifying information transmitted from the center apparatus, the OCR sheet specifying information being utilized to specify each of a plurality of formats of the types of OCR document sheets;
   second storing means for storing the OCR sheet specifying information received by the information receiving means;
   displaying means for displaying a piece of guide information transmitted from the center apparatus to select a group of format information from among a plurality of groups of format information respectively composed of one OCR sheet recognizing program stored in the first storing means and the OCR sheet specifying information stored in the second storing means;
   reading means for reading the contents written in a particular OCR document sheet; and
   character recognizing means for recognizing the contents read by the reading means as one or more characters according to a particular group of format information which is selected according to the guide information displayed by the displaying means, the particular group of format information being composed of a particular OCR sheet recognizing program relating to the particular OCR document sheet and the OCR sheet specifying information.

20. A facsimile apparatus according to claim 19, further comprising:
   character pattern generating means for generating a strain of characters according to a code conversion table, the strain of characters expressing the meaning of the contents recognized as the characters by the character recognizing means; and
   second displaying means for displaying the contents recognized as the characters by the character recognizing means and the strain of characters.

21. A facsimile apparatus for communicating with a center apparatus, comprising:
   first storing means for storing an OCR sheet recognizing program utilized to recognize contents written in each of a plurality of types of OCR document sheets as one or more characters;
   information receiving means for receiving a piece of OCR sheet specifying information and a plurality of pieces of format information transmitted from the center apparatus, the OCR sheet specifying information being utilized to specify each of a plurality of formats of the types of OCR document sheets;
   second storing means for storing the OCR sheet specifying information and the pieces of format information received by the information receiving means;
   displaying means for displaying a piece of guide information transmitted from the center apparatus to select a group of information from among a plurality of groups of information respectively composed of one OCR sheet recognizing program stored in the first storing means, the OCR sheet specifying information stored in the second storing means and one piece of format information stored in the second storing means;
   reading means for reading the contents written in a particular OCR document sheet of which a format is determined according to a particular piece of format information stored in the second storing means; and
   character recognizing means for recognizing the contents read by the reading means as one or more characters according to a particular group of information which is selected according to the guide information displayed by the displaying means, the particular group of information being composed of a particular OCR sheet recognizing program relating to the particular OCR document sheet, the particular piece of format information and the OCR sheet specifying information.

22. A facsimile apparatus according to claim 21, further comprising:
   character patterns generating means for generating a strain of characters according to a code conversion table, the strain of characters expressing the meaning of the contents recognized as the characters by the character recognizing means; and
   second displaying means for displaying the contents recognized as the characters by the character recognizing means and the strain of characters.

* * * * *